United States Patent
Shin et al.

(10) Patent No.: US 11,669,722 B2
(45) Date of Patent: Jun. 6, 2023

(54) ARTIFICIAL INTELLIGENCE REFRIGERATOR

(71) Applicant: LG ELECTRONICS INC., Seoul (KR)

(72) Inventors: Hyunseok Shin, Seoul (KR); Suho Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 477 days.

(21) Appl. No.: 16/846,233

(22) Filed: Apr. 10, 2020

(65) Prior Publication Data
US 2021/0192329 A1 Jun. 24, 2021

(30) Foreign Application Priority Data
Dec. 20, 2019 (KR) .................. 10-2019-0171666

(51) Int. Cl.
| | |
|---|---|
| *G06N 3/067* | (2006.01) |
| *F25D 23/02* | (2006.01) |
| *G06N 3/08* | (2023.01) |
| *F25D 29/00* | (2006.01) |

(52) U.S. Cl.
CPC ........... *G06N 3/067* (2013.01); *F25D 23/028* (2013.01); *G06N 3/08* (2013.01); *F25D 29/003* (2013.01); *F25D 2400/36* (2013.01)

(58) Field of Classification Search
CPC ........ G06N 3/067; G06N 3/08; F25D 23/028; F25D 29/003; F25D 2400/36; F25D 29/00; F25D 2500/06; F25D 2400/361; G06T 7/00
See application file for complete search history.

(56) References Cited

U.S. PATENT DOCUMENTS

| | | | | |
|---|---|---|---|---|
| 2014/0313328 A1* | 10/2014 | Park | .................. | F25D 29/00 |
| | | | | 348/143 |
| 2016/0305706 A1* | 10/2016 | Lim | .................. | F25D 23/025 |
| 2017/0191745 A1* | 7/2017 | Choi | .................. | F25D 23/028 |

FOREIGN PATENT DOCUMENTS

| | | | | |
|---|---|---|---|---|
| EP | 2743619 A1 * | 6/2014 | ......... | E05B 65/0042 |
| JP | 2019168134 | 10/2019 | | |
| KR | 20140125105 | 10/2014 | | |

(Continued)

OTHER PUBLICATIONS

Korean Intellectual Property Office Application Serial No. 10-2019-0171666, Notice of Allowance dated Jan. 25, 2021, 6 pages.

*Primary Examiner* — Kun Kai Ma
(74) *Attorney, Agent, or Firm* — Lee, Hong, Degerman, Kang & Waimey PC

(57) ABSTRACT

According to an embodiment of the present disclosure, an artificial intelligence refrigerator includes an inner door, an outer door having a transparent display on a front surface of the outer door, one or more cameras provided in the outer door, a sensor configured to detect an opening, a closing and an opening angle of the outer door, and at least one processor configured to determine whether the opening angle of the outer door is a preset angle when closing of the outer door is detected, photograph the inner door when the opening angle of the outer door is the preset angle, obtain a storage state of food items stored in the inner door, and display food management information on the transparent display based on the obtained storage state.

14 Claims, 39 Drawing Sheets

(56) References Cited

FOREIGN PATENT DOCUMENTS

| KR | 20140127589 | | 11/2014 |
|---|---|---|---|
| KR | 20140127590 A | * | 11/2014 |
| KR | 20170017326 | | 2/2017 |
| KR | 20170042535 | | 4/2017 |
| KR | 20180013448 | | 2/2018 |
| KR | 20190137271 | | 12/2019 |

* cited by examiner

FIG. 22A

| LIST: FOOD STORAGE LIST list | | | | |
|---|---|---|---|---|
| VEGETABLE COMPARTMENT | | | | CORRECT |
| | CORRECT | QUANTITY | LONG TERM STORAGE | PURC |
| image | APPLE | 1 | - | |
| image | PAPRIKA | 2 | - | Go |
| DID | | | | CORRECT |
| | ITEM | QUANTITY | LONG TERM STORAGE | PURCHASE |
| image | WATER | 3 | - | Go |
| image | JUICE | 2 | 1 | Go |
| image | MILK | 1 | 0 | Go |
| image | YOGURT | 3 | 1 | Go |
| image | BEER | 5 | 2 | - |

FIG. 22B

| LIST: FOOD STORAGE LIST list | | | | |
|---|---|---|---|---|
| VEGETABLE COMPARTMENT | | | | CORRECT |
| | CORRECT | QUANTITY | LONG TERM STORAGE | PURCHASE |
| image | APPLE | 1 | - | Go |
| image | PAPRIKA | 2 | - | Go |
| DID | | | | CORRECT |
| | ITEM | QUANTITY | LONG TERM STORAGE | PURCHASE |
| image | WATER | 3 | - | Go |
| image | JUICE | 2 | 1 | Go |
| image | MILK | 1 | 0 | Go |
| image | YOGURT | 3 | | Go |
| image | BEER | 5 | 2 | - |

FIG. 22C

| LIST: FOOD STORAGE LIST list | | | | |
|---|---|---|---|---|
| VEGETABLE COMPARTMENT | | | | CORRECT |
| | CORRECT | QUANTITY | LONG TERM STORAGE | PURCHASE |
| image | APPLE | 1 | - | Go |
| image | PAPRIKA | 2 | - | Go |
| DID | | | | CORRECT |
| | ITEM | QUANTITY | LONG TERM STORAGE | PURCHASE |
| image | WATER | 3 | - | Go |
| image | JUICE | 2 | 1 | Go |
| image | MILK | 2 | 0 | Go |
| image | YOGURT | 3 | 1 | Go |
| image | BEER | 5 | 2 | - |

2170 — LIST: FOOD STORAGE LIST list
2175 — CORRECT
2210 — image / MILK / 2

| FOOD MANAGEMENT | | | | |
|---|---|---|---|---|
| PANORAMIC VIEW | | LIST VIEW | | |
| VEGETABLE COMPARTMENT/MULTI STORAGE CORNER | | | | |
| 🍎 | APPLE | THREE | STORAGE OF 30 DAYS | PURCHASE |
| 🍐 | PEAR | ONE | STORAGE OF ONE DAY | PURCHASE |
| 🍊 | ORANGE | TWO | STORAGE OF TWO DAYS | PURCHASE |
| 🍆 | EGGPLANT | ONE | STORAGE OF 10 DAYS | PURCHASE |
| 🫑 | PIMENTO | ONE | STORAGE OF 5 DAYS | PURCHASE |
| 🥬 | CABBAGE | ONE | STORAGE OF ONE DAY | PURCHASE |
| LEFT DOOR/RIGHT DOOR | | | | |
| 🍾 | PERRIER | ONE | STORAGE OF THREE DAYS | PURCHASE |
| 🍺 | HEINEKEN | ONE | STORAGE OF THREE DAYS | PURCHASE |

FIG. 24C
2430
| < RECIPE RECOMMENDATION |
|---|
| ☑ SELECT ALL |
|---|
| TOTAL OF 15 RECIPES ARE FOUND |
|---|
| ☑ |  | APPLE | STORAGE OF 30 DAYS |
|---|---|---|---|
| ☑ |  | PEAR | STORAGE OF ONE DAY |
| ☑ |  | ORANGE | STORAGE OF TWO DAYS |
| ☑ |  | EGGPLANT | STORAGE OF 10 DAYS |
| ☑ |  | PIMENTO | STORAGE OF 5 DAYS |
| ☑ |  | CABBAGE | STORAGE OF ONE DAY |
| CANCEL | OK |
|---|---|

FIG. 25A

| FOOD MANAGEMENT | | | |
|---|---|---|---|
| PANORAMIC VIEW | | LIST VIEW | |
| VEGETABLE COMPARTMENT/MULTI STORAGE CORNER | | | |
| 🍎 APPLE | THREE | STORAGE OF 30 DAYS | PURCHASE |
| 🍐 PEAR | ONE | STORAGE OF ONE DAY | PURCHASE |
| 🍊 ORANGE | TWO | STORAGE OF TWO DAYS | PURCHASE |
| 🍆 EGGPLANT | ONE | STORAGE OF 10 DAYS | PURCHASE — 2501 |
| 🫑 PIMENTO | ONE | STORAGE OF 5 DAYS | PURC |
| 🥬 CABBAGE | ONE | STORAGE OF ONE DAY | PURCHASE |
| LEFT DOOR/RIGHT DOOR | | | |
| 🍾 PERRIER | ONE | STORAGE OF THREE DAYS | PURCHASE |
| 🍺 HEINEKEN | ONE | STORAGE OF ONE DAY | PURCHASE |

2410

ARTIFICIAL INTELLIGENCE REFRIGERATOR

CROSS-REFERENCE TO RELATED APPLICATIONS

Pursuant to 35 U.S.C. § 119(a), this application claims the benefit of earlier filing date and right of priority to Korean Patent Application No. 10-2019-0171666, filed on Dec. 20, 2019, the contents of which are hereby incorporated by reference herein in its entirety.

BACKGROUND OF THE INVENTION

1. Field of the Invention

The present disclosure relates to an artificial intelligence refrigerator, and more particularly, to an artificial intelligence refrigerator capable of photographing the inside of the refrigerator and recognizing food based on the photographed image.

2. Discussion of the Related Art

A refrigerator is an apparatus for supplying cold air generated by a freezing cycle to a refrigerator compartment and a freezer compartment to maintain the freshness of various foods for a long time.

In general, the refrigerator is configured to include a main body having a refrigerator compartment and a freezer compartment for storing food, and doors rotatably coupled to one side of the main body to open and close the refrigerator compartment and the freezer compartment.

The refrigerator compartment is divided into a plurality of spaces by shelves or the like to efficiently receive and store storage items according to the type of the storage items. The refrigerator compartment is provided with a storage compartment for storing meat and fish in the upper region, and a storage compartment for storing vegetables and fruits in the lower region.

On the other hand, in recent years, as the demand for advanced refrigerators is gradually increasing due to the improvement of the living environment, a display device is provided in the door of the refrigerator to provide information on the refrigerator and to control the refrigerator.

Moreover, in recent years, two doors are provided as doors of the refrigerator compartment, thus expanding the storage space.

In order for a user to grasp the current storage items of the refrigerator, the user has to open a refrigerator door directly and look at the inside thereof.

To this end, a refrigerator is conventionally provided with a camera on the ceiling of the refrigerator to provide information about a storage state of the refrigerator.

However, when the door of the refrigerator compartment is provided with two doors, there is a problem in that the food storage state of the door cannot be properly grasped by only the camera provided on the ceiling.

SUMMARY OF THE INVENTION

An object of the present disclosure is to provide an artificial intelligence refrigerator capable of identifying a food storage state of an inner door when the refrigerator compartment includes two doors, an outer door and an inner door.

An object of the present disclosure is to provide an artificial intelligence refrigerator capable of accurately identifying a food storage state of an inner door.

An object of the present disclosure is to provide an artificial intelligence refrigerator capable of identifying a food storage state of an inner door and inducing food stock management and food purchase of the inner door.

According to an embodiment of the present disclosure, an artificial intelligence refrigerator includes an inner door, an outer door having a transparent display on a front surface of the outer door, one or more cameras provided in the outer door, a sensor configured to detect an opening, a closing and an opening angle of the outer door, and at least one processor configured to determine whether the opening angle of the outer door is a preset angle when closing of the outer door is detected, photograph the inner door when the opening angle of the outer door is the preset angle, obtain a storage state of food items stored in the inner door, and display food management information on the transparent display based on the obtained storage state.

The outer door may include an outer case, a door liner mounted on a rear surface of the outer case, and a door dike disposed in the door liner to fix an outer basket capable of storing food to the rear surface of the outer case, and the one or more cameras are disposed on the door dike.

The one or more cameras may be disposed to be tilted by an angle obtained by subtracting the preset opening angle from 90 degrees.

The artificial intelligence refrigerator may display, on the transparent display, the food management information including at least one of stock change information of the food, purchase linkage information of the food, and recipe information using the food, based on the storage state.

According to an embodiment of the present disclosure, the user may easily grasp information on the food storage state of the inner door.

According to an embodiment of the present disclosure, the user's convenience to use the refrigerator may be greatly improved through the food stock management of the inner door and the purchase linkage service.

BRIEF DESCRIPTION OF THE DRAWINGS

FIGS. 22A to 22C are diagrams for describing a process of correcting food management information when an error occurs in food recognition through image recognition according to an embodiment of the present disclosure.

FIGS. 24A to 24C are diagrams for describing a process of recommending a recipe for cooking using a recognized food, according to an embodiment of the present disclosure.

FIGS. 25A to 25D illustrate a process of purchasing food through a transparent display provided in a refrigerator.

DETAILED DESCRIPTION OF THE PREFERRED EMBODIMENTS

<Artificial Intelligence (AI)>

Figure 1:
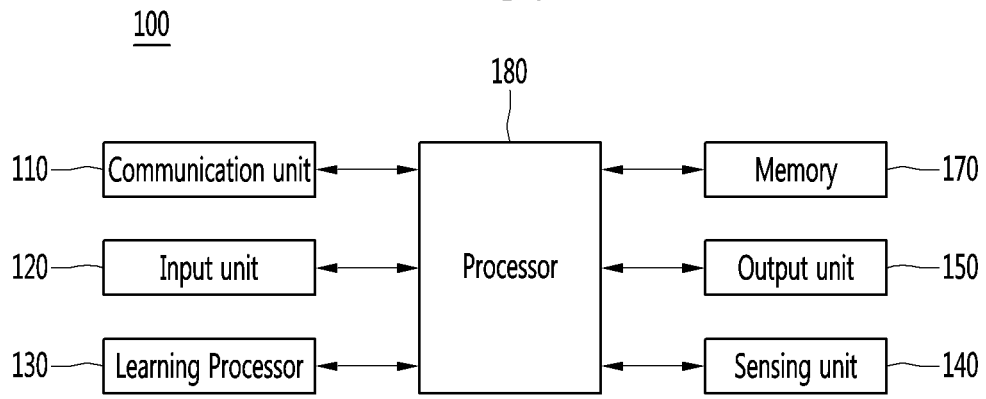
FIG. 1 illustrates an AI device according to an embodiment of the present disclosure.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network may be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer if the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving device may include an actuator or a motor and may perform various physical operations such as moving a robot joint. In addition, a movable robot may include a wheel, a brake, a propeller, and the like in a driving device, and may travel on the ground through the driving device or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined path, and a technology for automatically setting and traveling a path if a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

In this case, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are illustrated together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication interface 110, an input device 120, a learning processor 130, a sensing device 140, an output device 150, a memory 170, and a processor 180.

The communication interface 110 may transmit and receive data to and from external devices such as other AI devices 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input device 120 may acquire various kinds of data.

In this case, the input device 120 may include a camera for inputting a video signal, a microphone for receiving an audio signal, and a user input device for receiving information from a user. The camera or the microphone may be treated as a sensor, and the signal acquired from the camera or the microphone may be referred to as sensing data or sensor information.

The input device 120 may acquire a learning data for model learning and an input data to be used if an output is acquired by using learning model. The input device 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

In this case, the learning processor 130 may perform AI processing together with the learning processor 240 of the AI server 200.

In this case, the learning processor 130 may include a memory integrated or implemented in the AI device 100. Alternatively, the learning processor 130 may be implemented by using the memory 170, an external memory directly connected to the AI device 100, or a memory held in an external device.

The sensing device 140 may acquire at least one of internal information about the AI device 100, ambient environment information about the AI device 100, and user information by using various sensors.

Examples of the sensors included in the sensing device 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output device 150 may generate an output related to a visual sense, an auditory sense, or a haptic sense.

In this case, the output device 150 may include a display device for outputting time information, a speaker for outputting auditory information, and a haptic module for outputting haptic information.

The memory 170 may store data that supports various functions of the AI device 100. For example, the memory 170 may store input data acquired by the input device 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

If the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
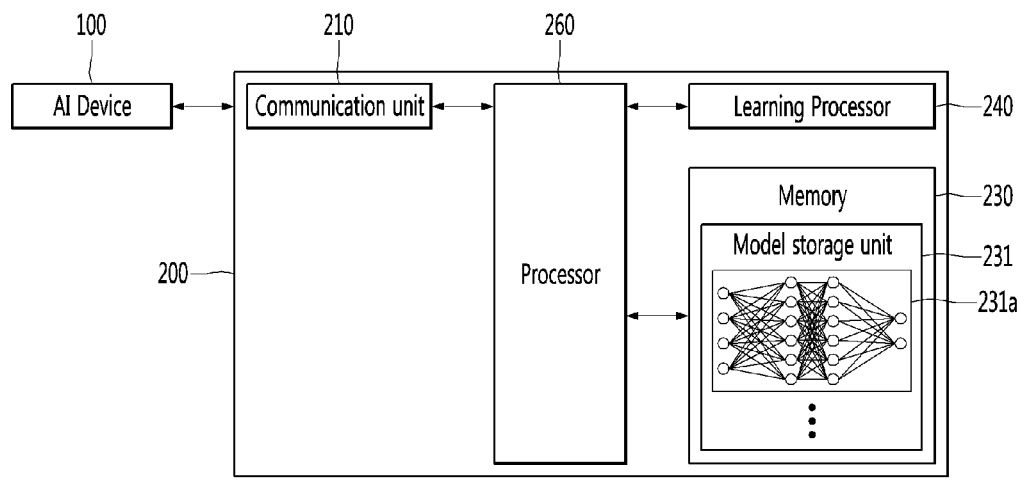
FIG. 2 illustrates an AI server according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. In this case, the AI server 200 may be included as a partial configuration of the AI device 100, and may perform at least part of the AI processing together.

The AI server 200 may include a communication interface [YK1] 210, a memory 230, a learning processor 240, a processor 260, and the like.

The communication interface 210 may transmit and receive data to and from an external device such as the AI device 100.

The memory 230 may include a model storage [YK2] 231. The model storage 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models is implemented in software, one or more instructions that constitute the learning model may be stored in memory 230.

The processor 260 may infer the result value for new input data by using the learning model and may generate a response or a control command based on the inferred result value.

Figure 3:
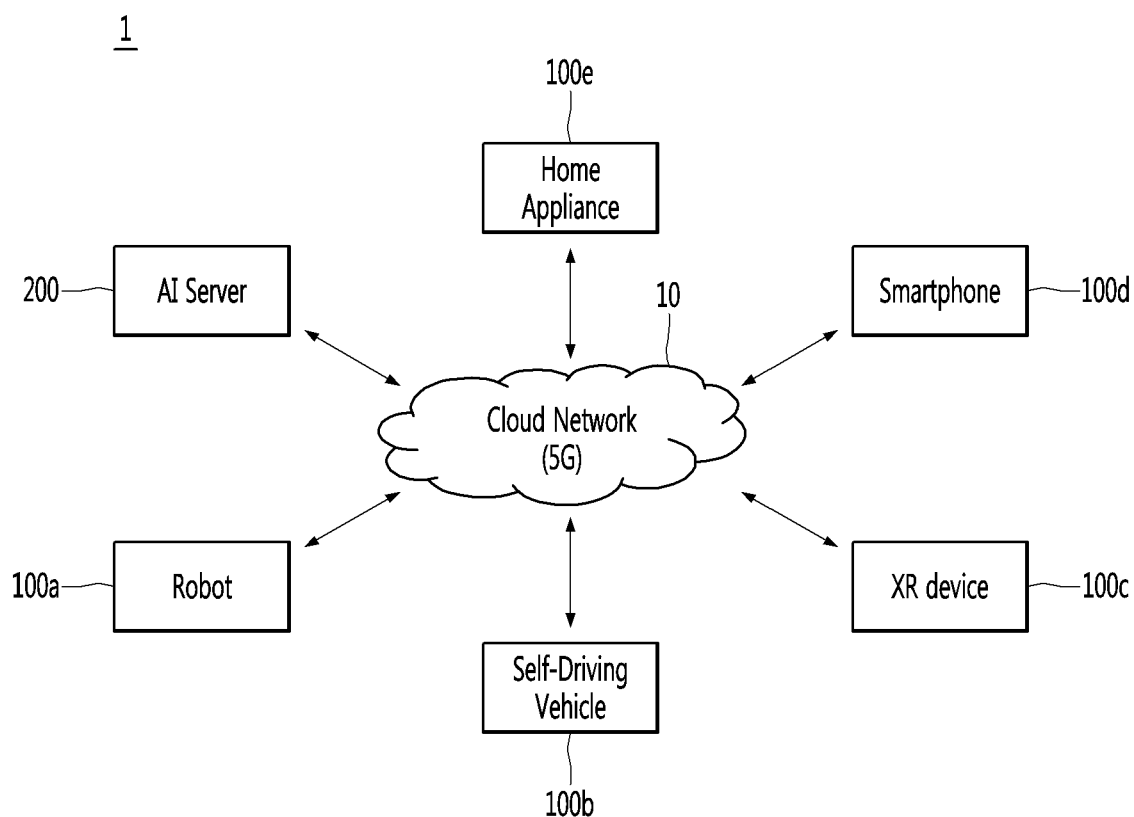
FIG. 3 illustrates an AI system according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smart-phone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

In other words, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, In other words, the robot 100a, the self-driving vehicle 100b, the XR device 100c, the smartphone 100d, or the home appliance 100e through the cloud network 10, and may assist at least part of AI processing of the connected AI devices 100a to 100e.

In this case, the AI server 200 may learn the artificial neural network according to the machine learning algorithm instead of the AI devices 100a to 100e, and may directly store the learning model or transmit the learning model to the AI devices 100a to 100e.

In this case, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the path and the travel plan, may determine the response to user interaction, or may determine the operation.

The robot 100a may use the sensor information acquired from at least one sensor among the lidar, the radar, and the camera so as to determine the travel path and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100*a* or may be learned from an external device such as the AI server 200.

In this case, the robot 100*a* may perform the operation by generating the result by directly using the learning model, but the sensor information may be transmitted to the external device such as the AI server 200 and the generated result may be received to perform the operation.

The robot 100*a* may use at least one of the map data, the object information detected from the sensor information, or the object information acquired from the external apparatus to determine the travel path and the travel plan, and may control the driving device such that the robot 100*a* travels along the determined travel path and travel plan.

The map data may include object identification information about various objects arranged in the space in which the robot 100*a* moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driving device based on the control/interaction of the user. In this case, the robot 100*a* may acquire the intention information of the interaction due to the user's operation or speech utterance, and may determine the response based on the acquired intention information, and may perform the operation.

<AI+Self-Driving>

The self-driving vehicle 100*b*, to which the AI technology is applied, may be implemented as a mobile robot, a vehicle, an unmanned flying vehicle, or the like.

The self-driving vehicle 100*b* may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the path and the travel plan, or may determine the operation.

Like the robot 100*a*, the self-driving vehicle 100*b* may use the sensor information acquired from at least one sensor among the lidar, the radar, and the camera so as to determine the travel path and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling movement line by using the recognized surrounding information or object information. The learning model may be learned directly from the self-driving vehicle 100*a* or may be learned from an external device such as the AI server 200.

In this case, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external apparatus to determine the travel path and the travel plan, and may control the driving device such that the self-driving vehicle 100*b* travels along the determined travel path and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving device based on the control/interaction of the user. In this case, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

In this case, the XR device 100*c* may perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel path or the travel plan. For example, the robot 100a and the self-driving vehicle 100b having the self-driving function may determine at least one of the travel path or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

In this case, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, if it is determined that the driver is in a drowsy state, the robot 100a may activate the self-driving function of the self-driving vehicle 100b or assist the control of the driving device of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot In other words subjected to control/interaction in an XR image. In this case, the robot 100a may be separated from the XR device 100c and interwork with each other.

If the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user may confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving vehicle 100b, to which the XR technology is applied, may refer to a self-driving vehicle having a means for providing an XR image or a self-driving vehicle In other words subjected to control/interaction in an XR image. Particularly, the self-driving vehicle 100b In other words subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

In this case, if the XR object is output to the HUD, at least part of the XR object may be outputted so as to overlap the actual object to which the passenger's gaze is directed. Meanwhile, if the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

If the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
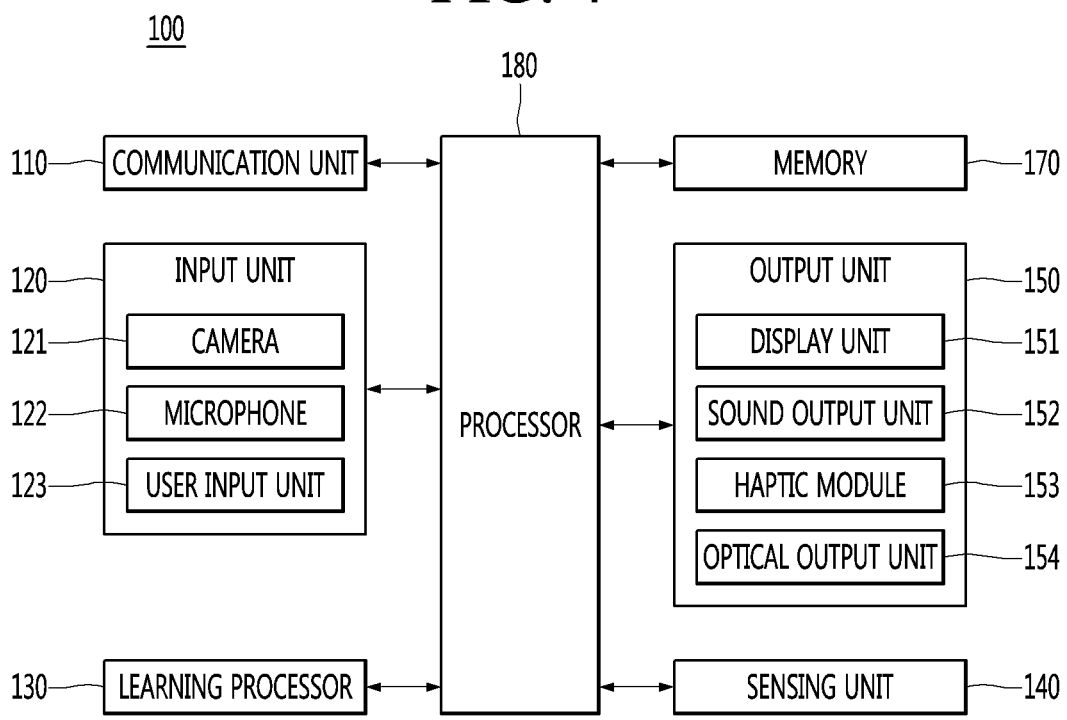
FIG. 4 illustrates an AI device according to another embodiment of the present disclosure.

FIG. 4 illustrates an AI device 100 according to an embodiment of the present disclosure.

The redundant repeat of FIG. 1 will be omitted below.

Referring to FIG. 4, the input device 120 may include a camera 121 for image signal input, a microphone 122 for receiving audio signal input, and a user input device 123 for receiving information from a user.

Voice data or image data collected by the input device 120 are analyzed and processed as a user's control command.

Then, the input device 120 is used for inputting image information (or signal), audio information (or signal), data, or information inputted from a user and the mobile terminal 100 may include at least one camera 121 in order for inputting image information.

The camera 121 processes image frames such as a still image or a video acquired by an image sensor in a video call mode or a capturing mode. The processed image frame may be displayed on the display device 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input device 123 is to receive information from a user and if information is inputted through the user input device 123, the processor 180 may control an operation of the mobile terminal 100 to correspond to the inputted information.

The user input device 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The output device 150 may include at least one of a display device 151, a sound output module 152, a haptic module 153, or an optical output module 154.

The display device 151 may display (output) information processed in the mobile terminal 100. For example, the display device 151 may display execution screen information of an application program running on the mobile terminal 100 or user interface (UI) and graphic user interface (GUI) information according to such execution screen information.

The display device 151 may be formed with a mutual layer structure with a touch sensor or formed integrally, so that a touch screen may be implemented. Such a touch screen may serve as the user input device 123 providing an input interface between the mobile terminal 100 and a user, and an output interface between the mobile terminal 100 and a user at the same time.

The sound output module 152 may output audio data received from the wireless communication interface 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user may feel. A representative example of a haptic effect that the haptic module 153 generates is vibration.

The optical output module 154 outputs a signal for notifying event occurrence by using light of a light source of the mobile terminal 100. An example of an event occurring in the AI device 100 includes message reception, call signal reception, missed calls, alarm, schedule notification, e-mail reception, and information reception through an application.

The refrigerator described below may be a home appliance having artificial intelligence. That is, the artificial intelligence device 100 may be a refrigerator.

The refrigerator may include all the components of the artificial intelligence device 100 shown in FIG. 4.

The refrigerator may be called an artificial intelligence refrigerator.

Figure 5:
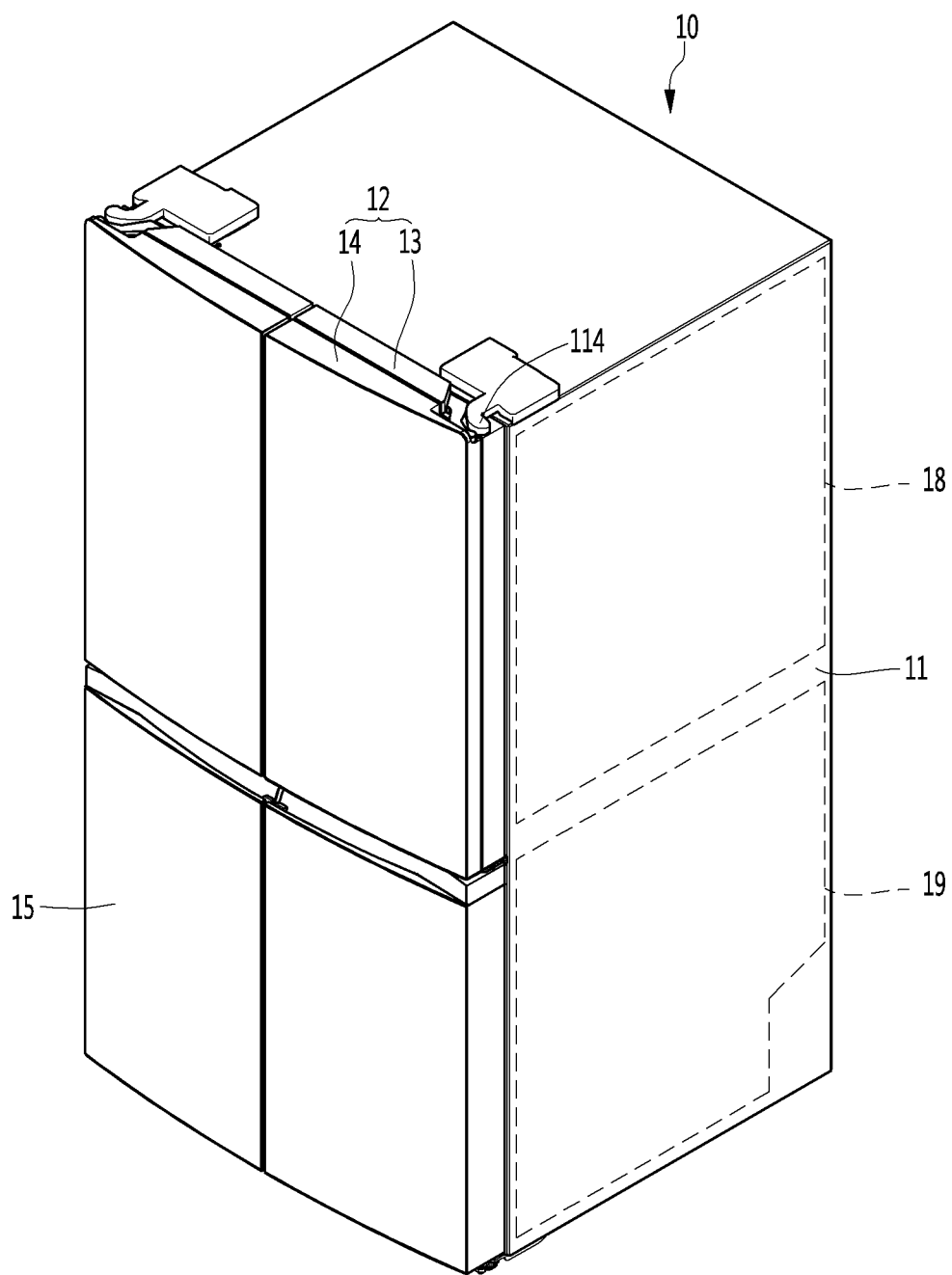
FIG. 5 is a perspective view of a refrigerator according to an embodiment of the present disclosure.
Figure 6:
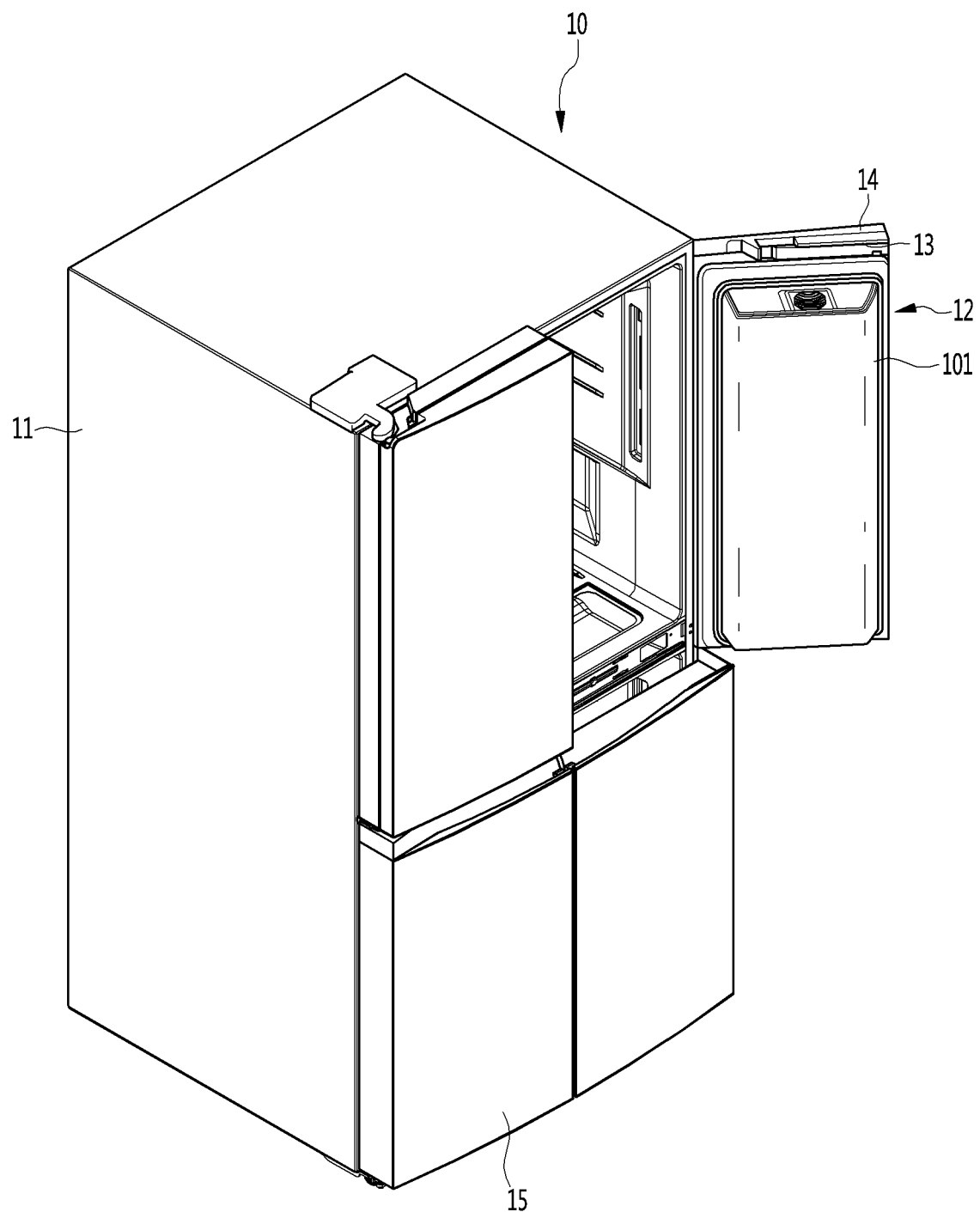
FIG. 6 is a perspective view showing a state in which a refrigerator compartment door of a refrigerator is opened according to an embodiment of the present disclosure.
Figure 7:
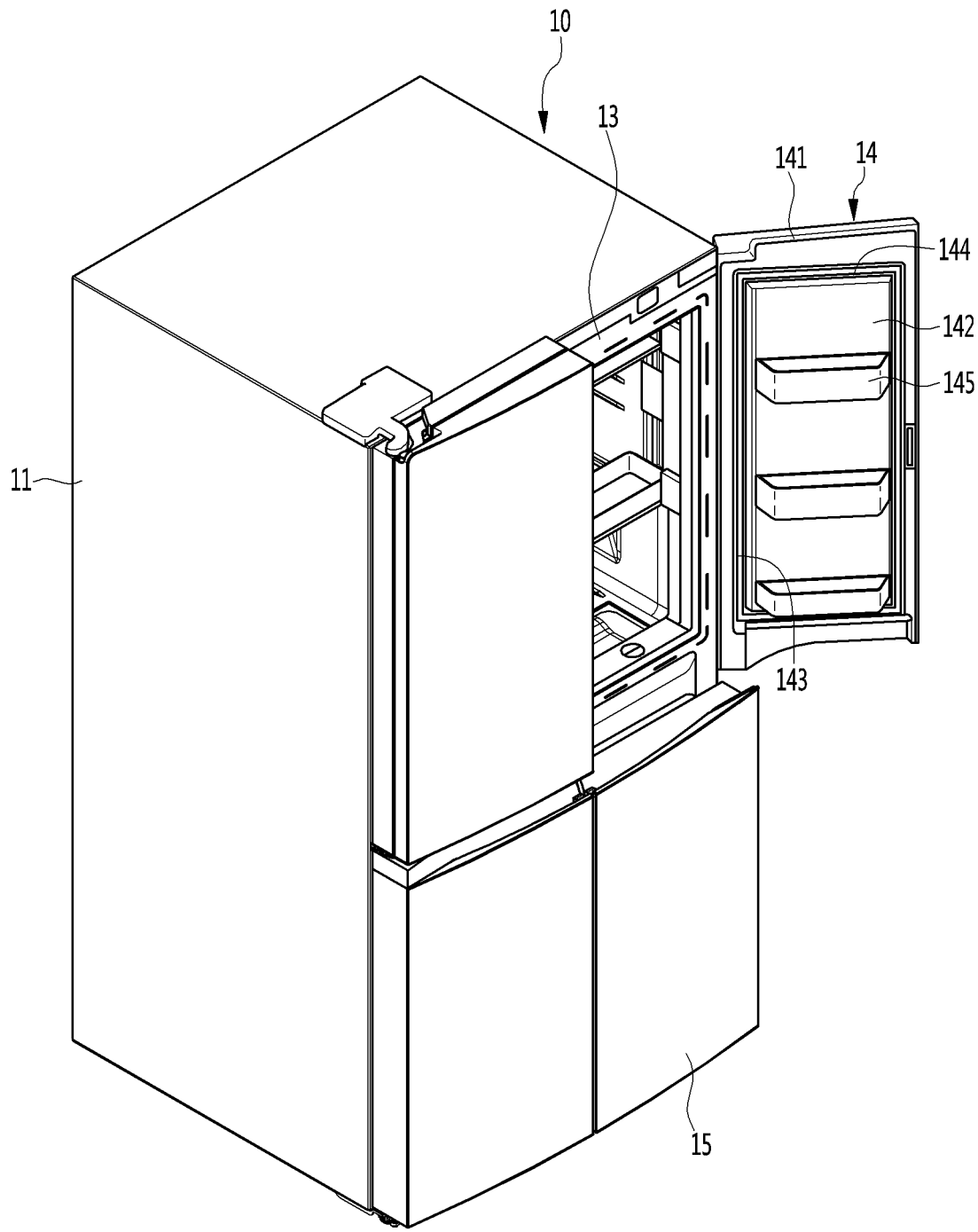
FIG. 7 is a perspective view showing a state in which an outer door of refrigerator compartment doors of a refrigerator is opened according to an embodiment of the present disclosure.

FIG. 5 is a perspective view of a refrigerator according to an embodiment of the present disclosure, FIG. 6 is a perspective view showing a state in which a refrigerator compartment door of a refrigerator is opened according to an embodiment of the present disclosure, and FIG. 7 is a perspective view showing a state in which an outer door of refrigerator compartment doors of a refrigerator is opened according to an embodiment of the present disclosure.

Referring to FIGS. 5 to 7, the refrigerator 10 may include a cabinet 11 having a plurality of storage compartments therein and doors 12 and 15 provided in a front surface of the cabinet 11 to selectively open or close any one of the plurality of storage compartments.

The plurality of storage compartments may include a refrigerator compartment 18 and a freezer compartment 19.

The doors 12 and 15 may include a refrigerator compartment door 12 rotatably provided in the front of a refrigerator compartment 180 and a freezer compartment door 15 rotatably provided in the front of a freezer compartment 19.

Cold air generated by an evaporator may be supplied to the refrigerator compartment 180, and the inside of the refrigerator compartment 180 may be cooled. The evaporator may be provided behind a rear wall of the refrigerator compartment.

The refrigerator compartment door 12 may be provided as a pair, and may be rotatably connected to the front left and right edges of the cabinet 11.

The refrigerator compartment door 12 may include an inner door 13 which is in close contact with the front of the cabinet 11 and an outer door 14 which is rotatably connected to the inner door 13 at the front of the inner door 13.

The outer door 14 and the inner door 13 may be referred to as a first door and a second door respectively.

In a state in which the inner door 13 is closed, edges of the rear surface are in close contact with the front surface of the cabinet 11, and in a state in which the outer door 14 is closed, the edges of the rear surface are in close contact with the front surface of the inner door 13. The housing 101 may be mounted on the rear surface of the inner door 13.

A first hinge 114 may be provided on the upper side of the cabinet 11 such that the refrigerator compartment door 12 may be rotatable with respect to the cabinet 11.

One side of the first hinge 114 may be connected to the upper surface of the cabinet 11, and the other side thereof may be connected to the inner door 13. The inner door 13 and the outer door 13 may be rotatable together about the first hinge 114.

The inner door 13 may include a second hinge (not shown) that enables the outer door 14 to be rotatable with respect to the inner door 13. The outer door 14 may be rotated around the second hinge alone, and a front portion of the inner door 13 may be opened by the rotation of the outer door 14.

The outer door 14 may include an outer case 141, a door liner 142 mounted on a rear surface of the outer case 141, and a door dike 143 protruding to a predetermined height from the outer liner 142 and disposed to be surrounded along outer edges of the door liner 142.

An outer basket 145 capable of storing food may be mounted on the rear surface of the outer door 14. The outer basket 145 may be detachably coupled to the door dike 143. A plurality of outer basket 145 may be provided and may be spaced apart from one another by a predetermined distance in the vertical direction.

The door liner 142 may be provided with a sealing member 144. The sealing member 144 may be disposed along edges of the rear portion of the outer case 141 to prevent the leakage of cold air in a space between the inner door 13 and the outer door 14.

The door dike 143 may fix the outer basket 145.

Figure 8:
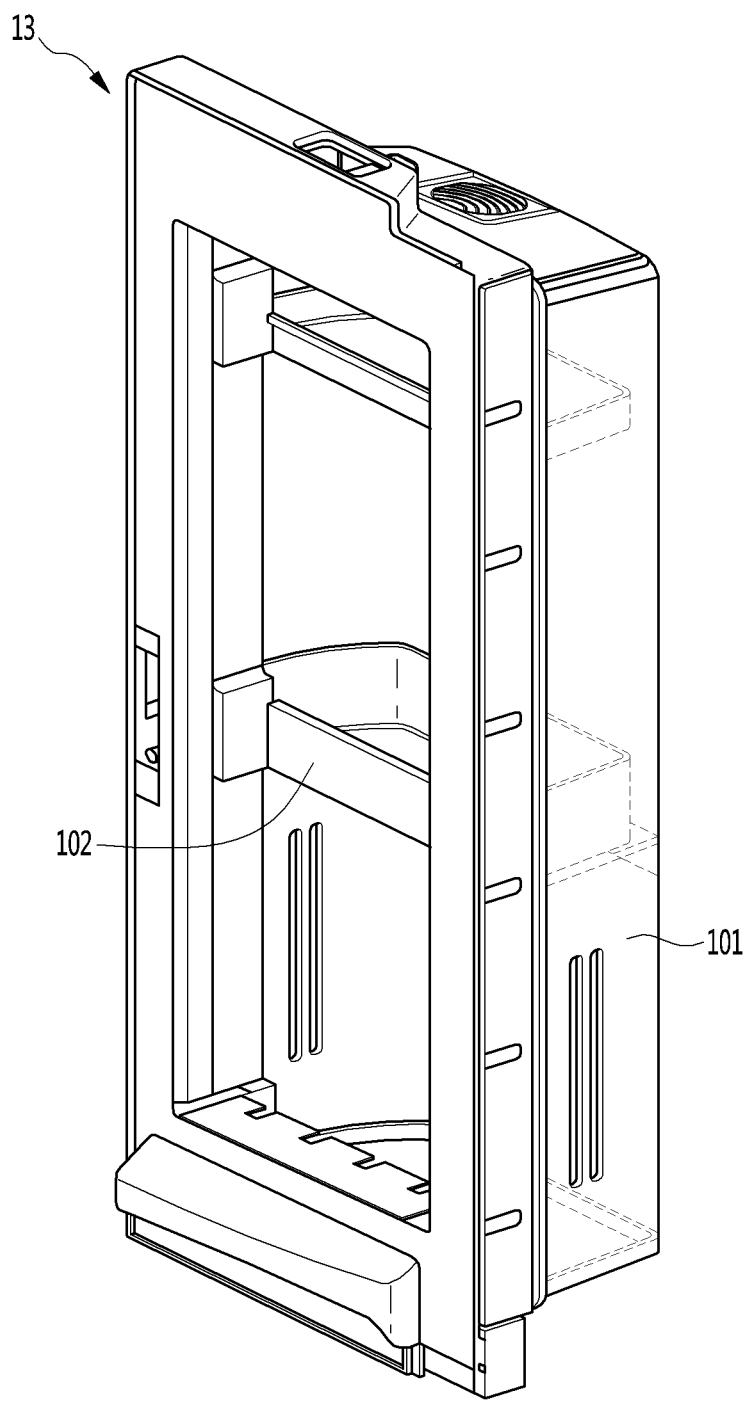
FIG. 8 is a perspective view showing a configuration of an inner door of a refrigerator compartment door of a refrigerator according to an embodiment of the present disclosure.

FIG. 8 is a perspective view showing a configuration of an inner door of a refrigerator compartment door of a refrigerator according to an embodiment of the present disclosure.

The housing 101 may be coupled to the rear of the inner door 13. The basket 102 may be mounted in a storage space of the housing 101.

A plurality of baskets 102 may be provided and store food.

Figure 9:
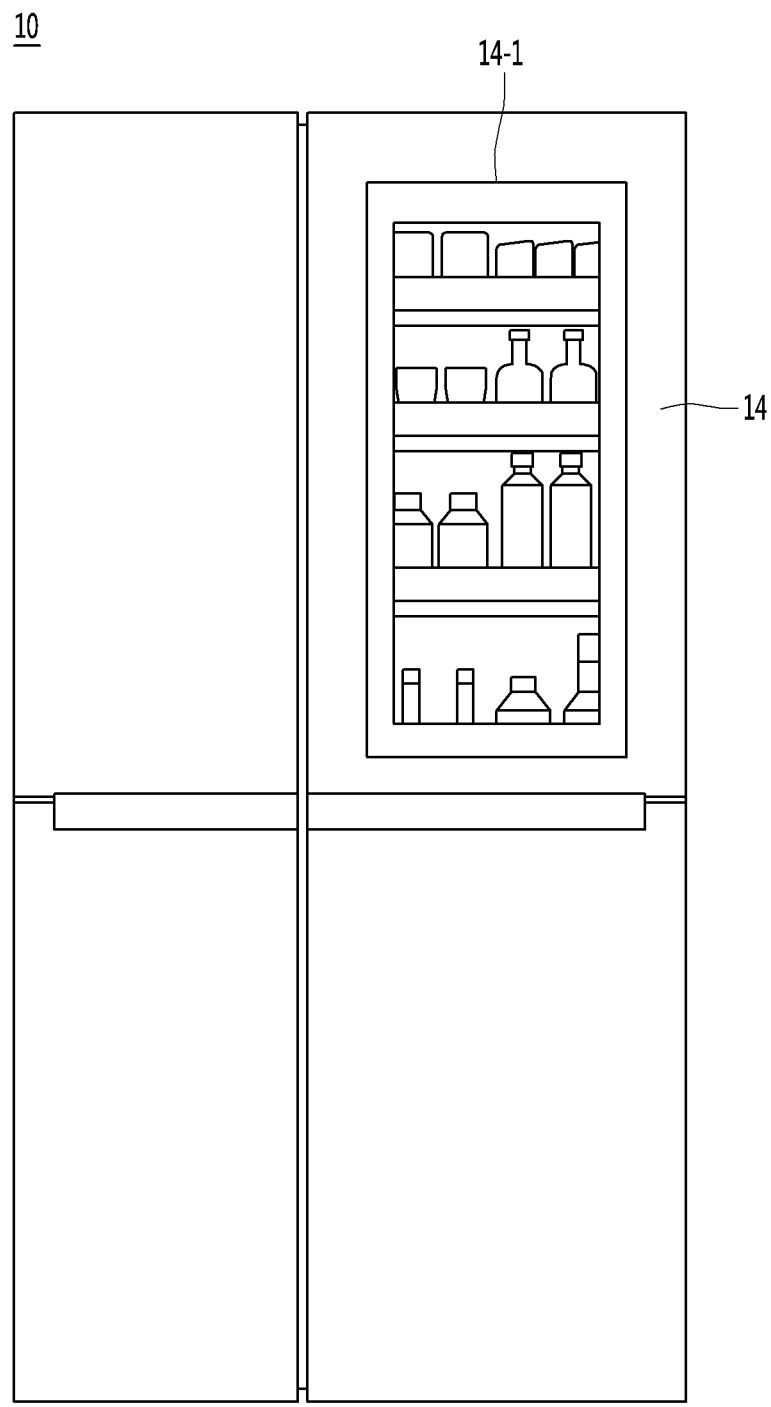
FIG. 9 is a front view of a refrigerator in a state in which a refrigerator compartment door is closed according to an embodiment of the present disclosure.

FIG. 9 is a front view of a refrigerator in a state in which a refrigerator compartment door is closed according to an embodiment of the present disclosure.

That is, FIG. 9 shows a state where both the inner door 13 and the outer door 14 are closed.

A transparent display 14-1 may be provided at the front of the outer door 14 of the refrigerator 10. A user may see food stored in the refrigerator compartment through the transparent display 14-1.

As will be described later, the transparent display 14-1 may display information about food stored in the refrigerator 10.

Figure 10:
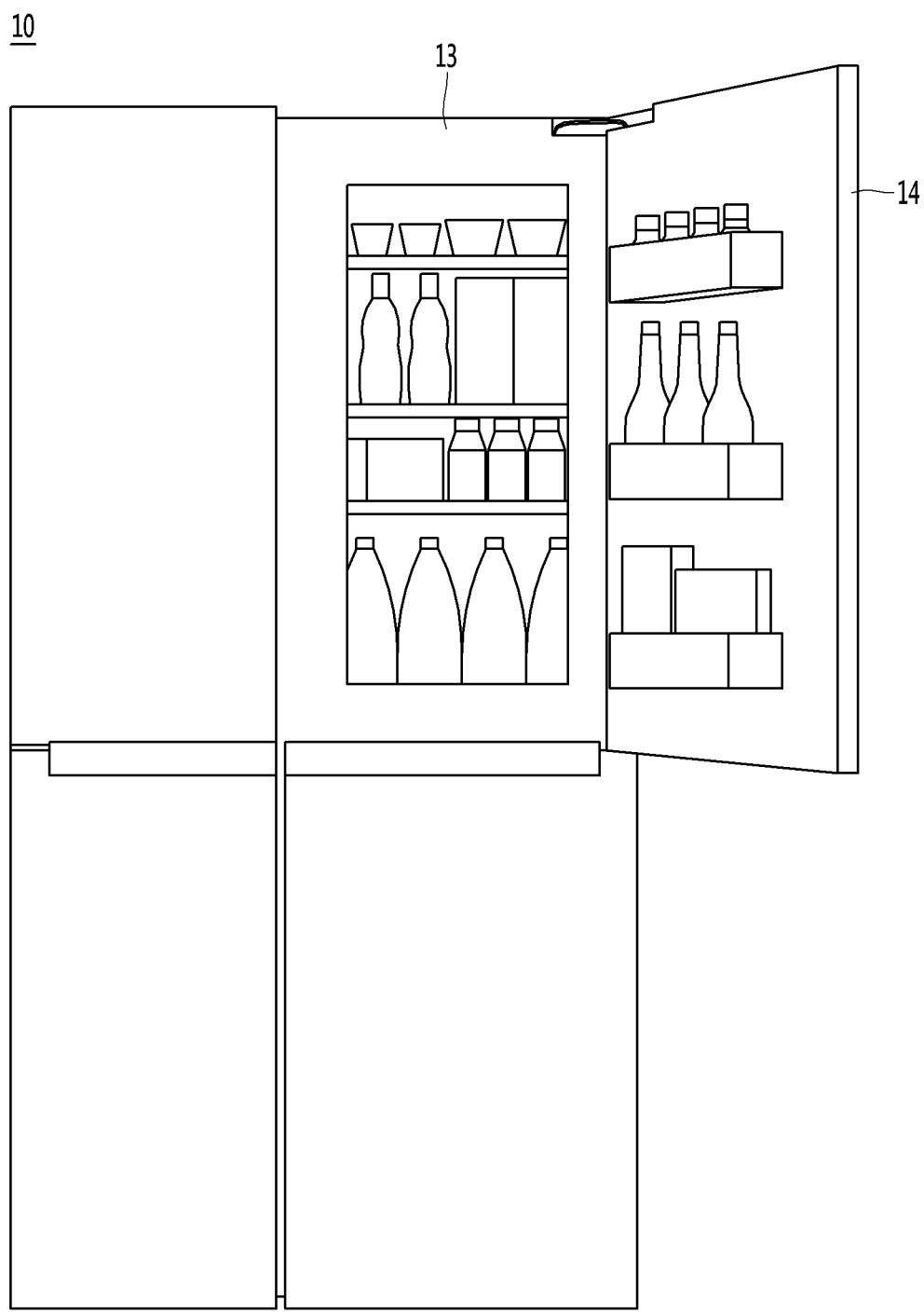
FIG. 10 is a front view of a refrigerator in a state in which an outer door is opened and an inner door is closed according to an embodiment of the present disclosure.

FIG. 10 is a front view of a refrigerator in a state in which an outer door is opened and an inner door is closed according to an embodiment of the present disclosure.

Referring to FIG. 10, only the outer door 14 constituting a refrigerator compartment door is opened, and the inner door 13 is closed.

The outer door 14 may be provided with one or more cameras. The one or more cameras may photograph the inside of the refrigerator compartment when the outer door 14 is closed.

In particular, the one or more cameras may photograph foods stored in the inner door 13.

Figure 11:
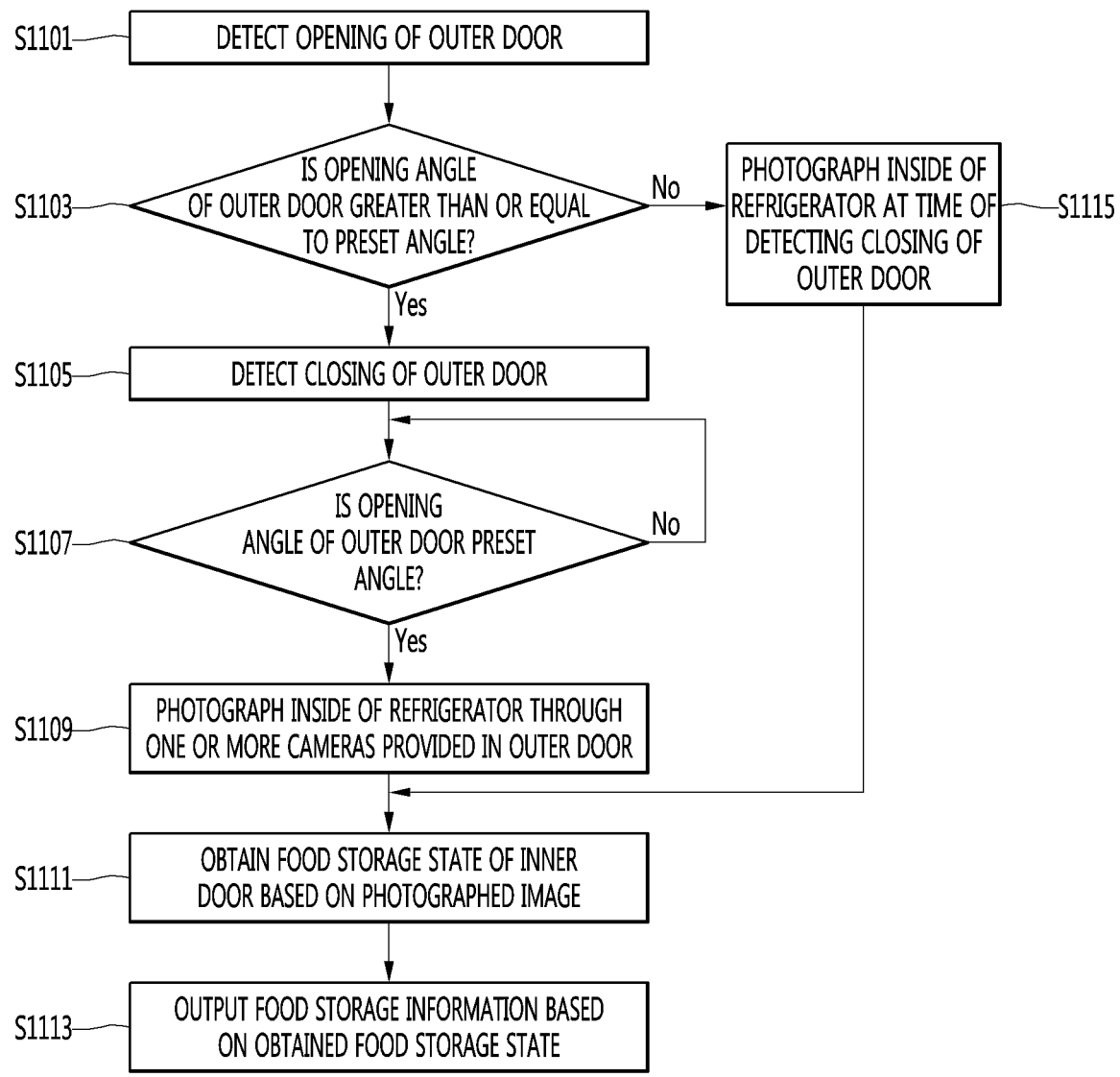
FIG. 11 is a flowchart illustrating a method of operating a refrigerator according to an embodiment of the present disclosure.

FIG. 11 is a flowchart illustrating a method of operating a refrigerator according to an embodiment of the present disclosure.

In FIG. 11, the refrigerator 10 may include all the components of FIG. 4.

FIG. 11 may be a diagram for describing the method of operating the refrigerator 10 for managing food stored in the inner door 13 of the refrigerator 10.

Referring to FIG. 11, a processor 180 of the refrigerator 10 may detect that the outer door 14 is opened (S1101).

The processor 180 may detect whether the outer door 14 is opened or closed by using a sensor provided in the sensing device 140.

For example, the sensing device 140 may include one or more of an optical sensor, a mechanical sensor, an electromagnet sensor, and an acceleration sensor.

The processor 180 may detect the opening/closing operation of the outer door 14 or the opening angle of the outer door 14 based on a sensing signal detected by the sensing device 140.

The sensing device 140 may be included in the hinge 114 or disposed at a position adjacent to the hinge 114.

The optical sensor is a sensor that detects the presence or absence of light, the intensity of light, and the like, and may be a proximity sensor that detects the proximity of an object that is a detection target. The processor 180 may determine whether the outer door 14 is opened or closed or the opening angle by using the presence or absence of light or the intensity of light detected by the optical sensor.

The mechanical sensor may be a sensor that detects a contact from the outside and may be a switch sensor. The processor 180 may detect whether the outer door 14 is opened or closed or the opening angle by using a detection signal indicating whether there is a contact, which is detected by the mechanical sensor.

The electromagnet sensor is a sensor for detecting the magnitude and direction of an electromagnetic field and may be a Hall sensor using the Hall effect. The processor 180 may detect whether the outer door 14 is opened or closed or the opening angle by using a change in the magnitude of the electromagnetic field or a change in the direction of the electromagnetic field which is detected by the electromagnetic sensor.

The acceleration sensor may be a sensor that measures the magnitude of an acceleration along each of the x-axis, the y-axis, and the z-axis. The processor 180 may determine whether the outer door 14 is opened or closed or measure an opening angle by using the magnitudes of the accelerations measured along the three axes.

The processor 180 of the refrigerator 10 may determine whether an opening angle of the outer door 14 is greater than or equal to a preset angle (S1103).

The processor 180 may measure the opening angle of the outer door 14 using any one of the optical sensor, the mechanical sensor, the electromagnet sensor, and the acceleration sensor.

The opening angle of the outer door 14 may represent an opening angle with respect to a state in which the outer door 14 is completely closed.

The preset angle may be an angle set to optimally obtain an image of foods stored in the inner door 13.

The preset angle may be 60 degrees, but is only an example. That is, an angular range may be set instead of a specific angle.

The processor 180 of the refrigerator 10 may determine that the opening angle of the outer door 14 is greater than or equal to the preset angle, and then detect the closing of the outer door 14 (S1105).

The processor 180 of the refrigerator 10 may determine whether the opening angle of the outer door 14 reaches the preset angle (S1107).

The processor 180 may determine whether the opening angle of the outer door 14 is equal to the preset angle while the outer door 14 is being closed.

When the opening angle reaches the preset angle while the outer door 14 is being closed, the processor 180 of the refrigerator 10 may photograph(or capture) the inside of the refrigerator through one or more cameras provided in the outer door 14 (S1109).

When the opening angle of the outer door 14 is equal to the preset angle, the processor 180 may transmit a capture command to the one or more cameras provided in the outer door 14.

The one or more cameras may photograph the inside of the refrigerator 10 according to the capture command.

In particular, the one or more cameras may photograph foods stored in the inner door 13.

The one or more cameras may be provided on a side of the outer door 14. The one or more cameras may be provided around an edge of the outer door 14.

Hereinafter, a process of photographing the inside of the refrigerator through the one or more cameras and the arrangement of the one or more cameras when the outer door 14 is opened and then closed.

Figure 12:
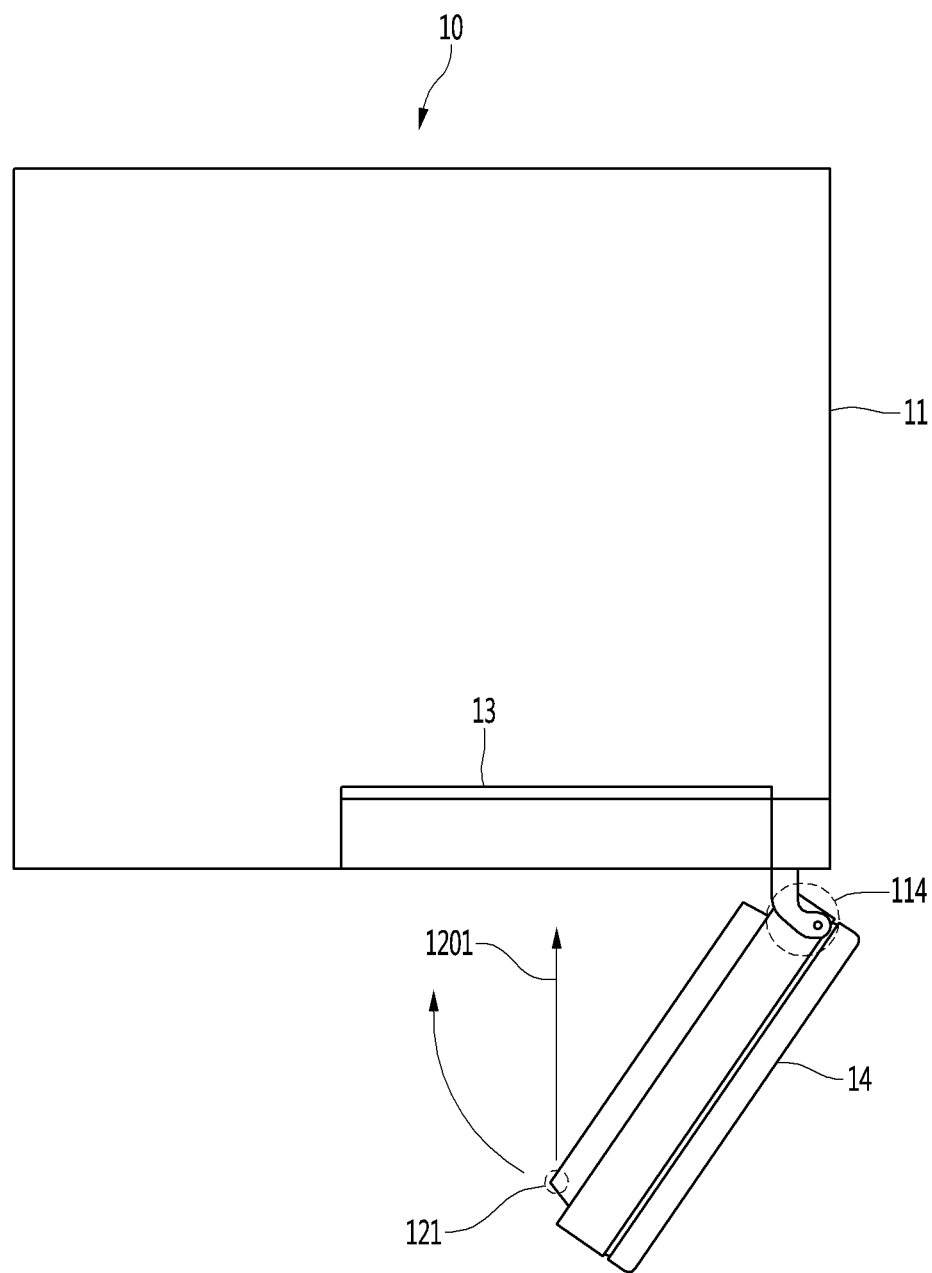
FIG. 12 is a diagram for describing an example of photographing the inner door when the outer door is at the preset angle according to an embodiment of the present disclosure.

FIG. 12 is a diagram for describing an example of photographing the inner door when the outer door is at the preset angle according to an embodiment of the present disclosure.

The refrigerator 10 may detect that the outer door 14 is closed after the outer door 14 is opened at a predetermined angle or more.

The refrigerator 10 may transmit a capture command to the camera 121 when the opening angle of the outer door 14 reaches a preset angle while the outer door 14 is being closed. When the camera 121 receives the capture command, the camera 121 may photograph a front area.

When the outer door 14 is opened at a preset angle, the photographing direction 1201 of the camera 121 may be a front surface of the inner door 13.

That is, when the outer door 14 reaches the preset angle, the camera 121 may photograph the front surface of the inner door 13.

The user may open the outer door 14 and store a food in the inner door 13 or withdraw the food from the inner door 13.

Conventionally, since a camera is provided only in the ceiling wall of the refrigerator 10, it may be difficult to figure out information on the food stored in the inner door 13 properly.

According to an embodiment of the present disclosure, when the user opens and then closes the outer door 14, an image of the inner door 13 may be photographed at an optimal photographing angle. The photographed image may be used to manage a food storage state of the inner door 13.

Figure 13:
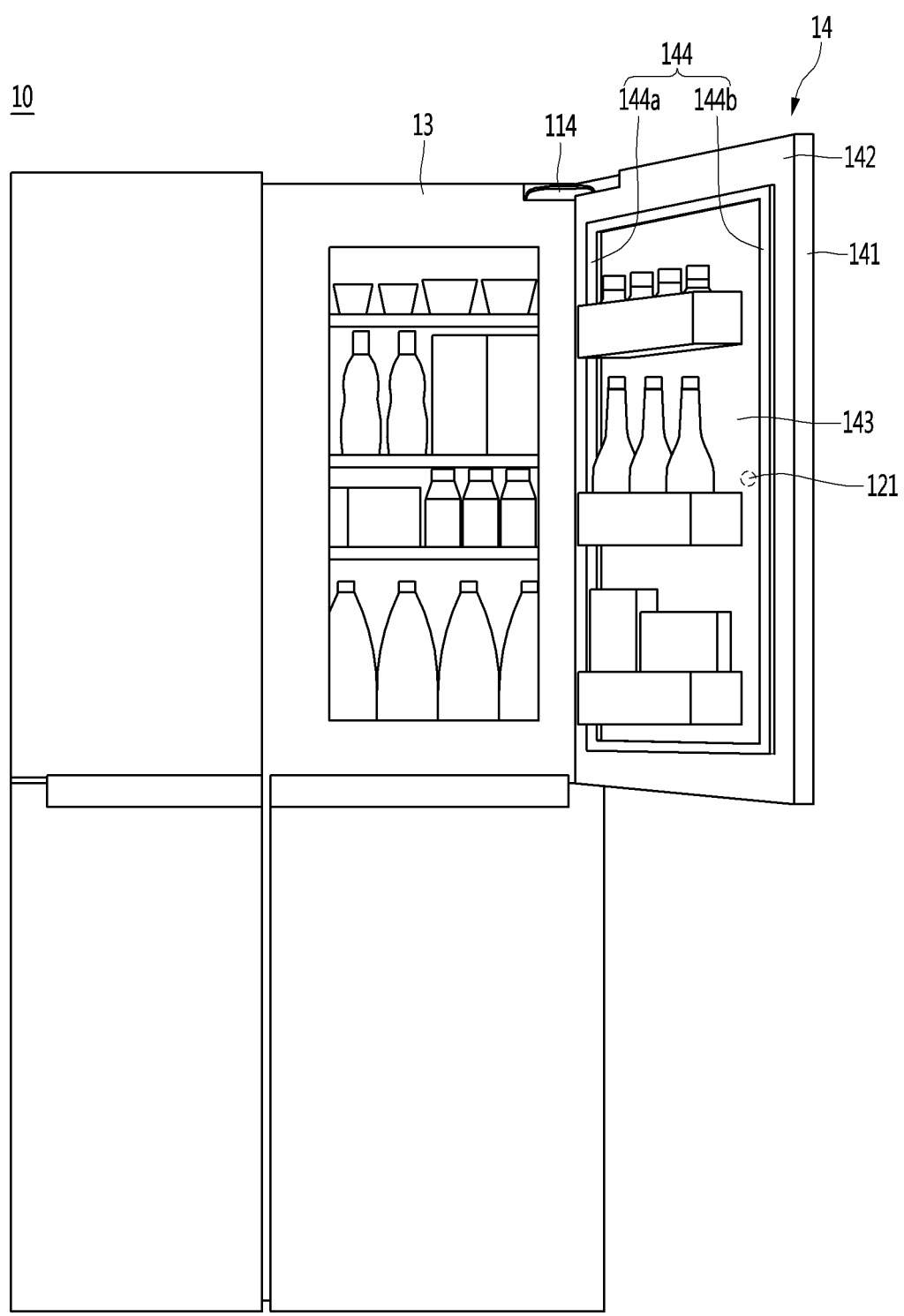
FIGS. 13 to 14 are diagrams for describing an arrangement of cameras provided in an outer door according to various embodiments of the present disclosure.
Figure 14:
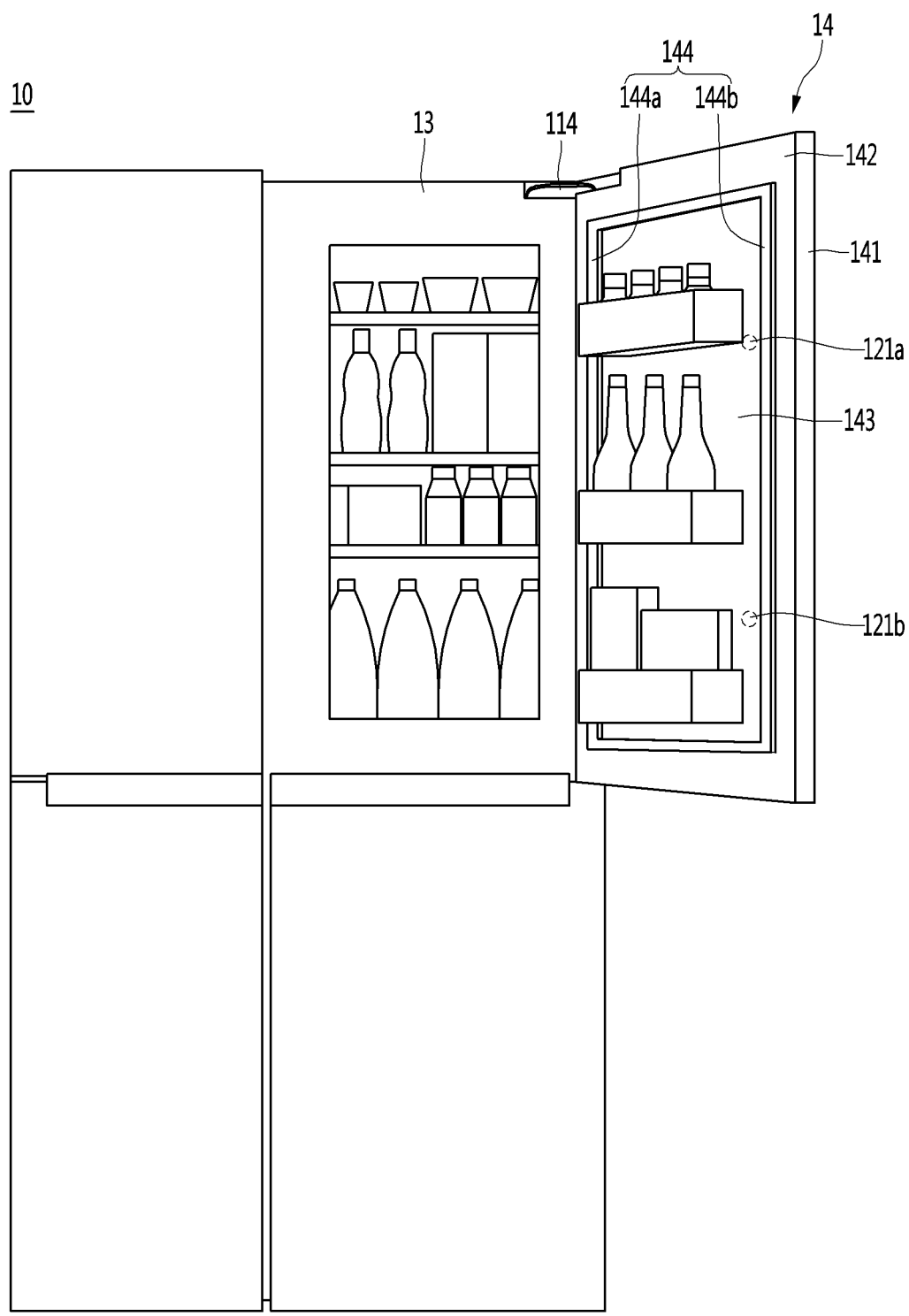

FIGS. 13 to 14 are diagrams for describing an arrangement of a camera provided in an outer door according to various embodiments of the present disclosure.

FIG. 13 illustrates an embodiment when one camera is provided in the outer door, and FIG. 14 is an embodiment when two cameras are provided in the outer door.

Referring to 13 and 14, the outer door 14 may include an outer case 141, a door liner 142, a sealing member 144, and a door dike 143.

The door case 141 may be a metal plate forming the front surface of the outer door 14.

The door liner 142 may be formed of a material such as plastic inside the door case 141.

The sealing member 144 may be formed of an elastic material such as rubber.

The sealing member 144 may seal an internal cold air of the refrigerator compartment from leaking to the outside when the outer door 14 is closed.

The sealing member 144 may be disposed on the rear surface of the door liner 142.

The sealing member 144 may include an inner sealing member 144a and an outer sealing member 144b. The inner sealing member 144a may be disposed adjacent to a first hinge 114, and the outer sealing member 144b may be disposed farther than the first hinge 114, compared to the inner sealing member 144a.

A pair of connection gaskets connecting the inner sealing member 144a and the outer sealing member 144b may be further provided between the inner sealing member 144a and the outer sealing member 144b.

The door dike 143 may fix a basket provided in the outer door 14.

FIG. 13 shows an example in which one camera 121 is disposed in the door dike 143 of the outer door 14.

Referring to FIG. 13, the camera 121 may be located at the door dike 143 adjacent to the outer sealing member 144b.

The door dike 143 may include a receiving groove for accommodating the camera 121, and the camera 121 may be provided in the receiving groove.

Referring to FIG. 14, an example in which two cameras are disposed in the door dike 143 of the outer door 14 is illustrated.

The door dike 143 may be provided with a first camera 121a and a second camera 121b.

The first camera 121a and the second camera 121b may be disposed at a predetermined distance. The distance between the first camera 121a and the second camera 121b may be 338 mm, but this is only an example.

A first image photographed by the first camera 121a may be used to analyze a storage state of food stored in an upper shelf of the inner door 13, and a second image photographed by the second camera 121b may be used to analyze a storage state of food stored in a lower shelf of the inner door 13.

Each of the camera 121 shown in FIG. 13 and the cameras 121a and 121b shown in FIG. 14 may have a high frame rate that is robust to blur. For example, the frame rate of each camera may be 60 fps.

Each camera may be a wide angle camera, and the angle of view of the camera may be 135 degrees.

Hereinafter, the arrangement structure of the camera provided in the outer door and the outer door will be described in detail.

Figure 15A:
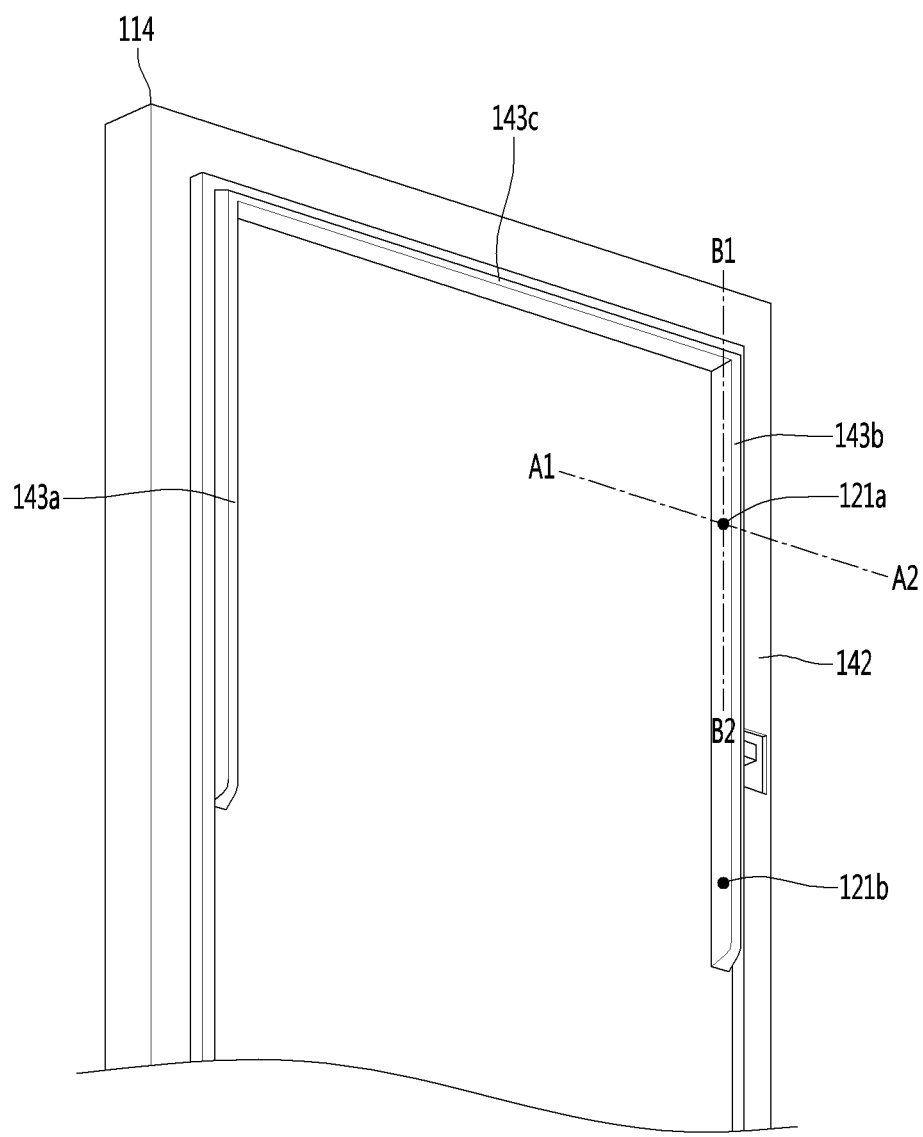
FIGS. 15A and 15B are diagram for describing arrangement positions of a camera attached to a door dike of an outer door according to one embodiment of the present disclosure.
Figure 15B:
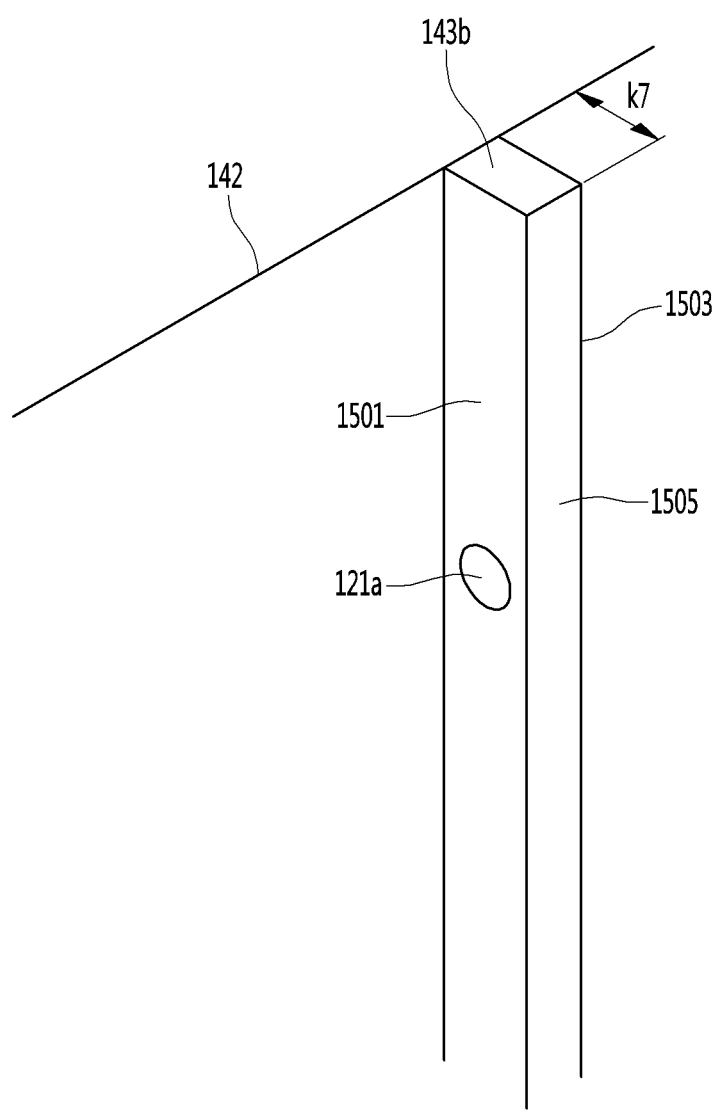

FIGS. 15A and 15B are diagram for describing arrangement positions of a camera attached to a door dike of an outer door according to one embodiment of the present disclosure.

In particular, FIG. 15A illustrates an example in which the door dike 143 is provided with two cameras 121a and 121b.

Referring to FIG. 15A, the outer door 14 may include a door liner 142 and a door dike 143 protruding to a predetermined height from the door liner 142 and disposed to be surrounded along outer edges of the door liner 142.

The door dike 143 may include a first part 143a, a second part 143b, and a third part 143c. The door dike 143 may be a frame having a rectangular shape.

The first part 143a and the second part 143b may face each other. The length of the first part 143a and the length of the second part 143b may be longer than the length of the third part 143c.

The third part 143c may connect the first part 143a and the second part 143b to each other.

A fourth part (not shown) may connect the first part 143a and the second part 143b to each other.

The first part 143a may be closer to the first hinge 114 than the second part 143b.

The first camera 121a and the second camera 121b may be embedded in the second part 143b of the door dike 143. In order for the first camera 121a and the second camera 121b to be embedded in the second part 143b of the door dike 143, the second part 143b may be provided with a built-in groove.

Referring to FIG. 15B, an arrangement position of the first camera 121a is illustrated. The second part 143b of the door dike 143 may include a first surface 1501, a second surface 1503, and a third surface 1505. The second part 143b may protrude by a predetermined height k7 based on the door liner 142.

The first surface 1501 and the second surface 1503 may be disposed to face each other. The third surface 1505 may connect the first surface 1501 and the second surface 1503.

The first surface 1501 may face the right side of the outer door 14 and the second surface 1503 may face the left side of the outer door 14.

The first camera 121a may be provided on the first surface 1501 of the second part 143b.

In a state where the outer door 14 is completely closed, the first surface 1051 may face the front surface of the inner door 13.

The second camera (not shown) may be provided below the first camera 121a. The second camera may also be provided on the first surface 1501 of the second part 143b.

Even when one camera is provided, the camera may be provided on the first surface 1501 of the second part 143b.

The arrangement of the camera will be described in more detail.

Figure 16A:
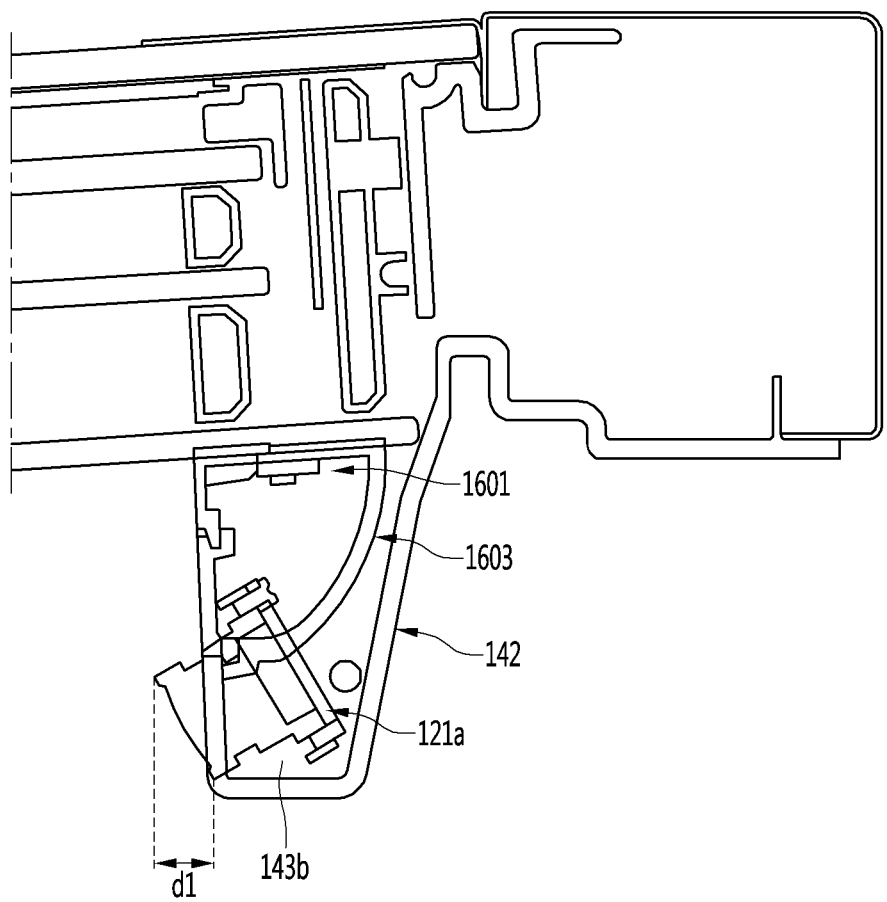
FIG. 16A is a transverse cross-sectional view of the outer door 14 taken in the direction A1-A2 in FIG. 15A.
Figure 16B:
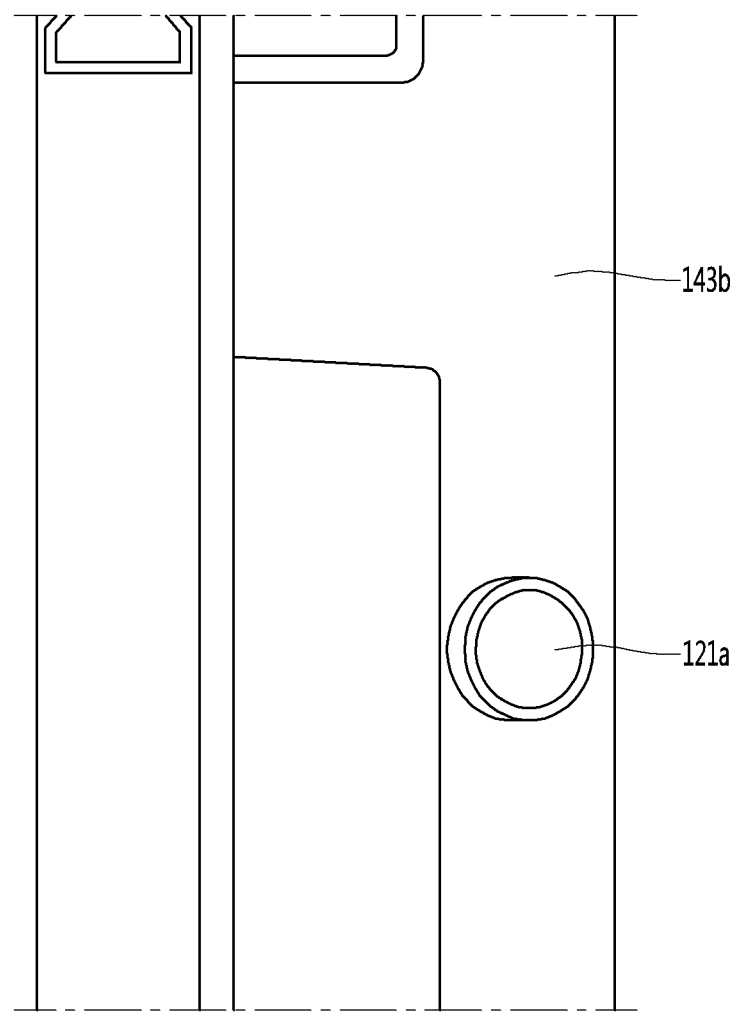
FIG. 16B is a longitudinal cross-sectional view of the outer door 14 taken in the direction B1-B2 in FIG. 15A.

FIG. 16A is a transverse cross-sectional view of the outer door 14 taken in the direction A1-A2 in FIG. 15A, and FIG. 16B is a longitudinal cross-sectional view of the outer door 14 taken in the direction B1-B2 in FIG. 15A.

Referring to 16A and 16B, a first camera 121a may be provided in the second part 143b of the door dike 143 provided along the outer edges of the door liner 142.

An LED module 1601 that emits light and an LED cover 1603 may be further included in the second part 143b.

A portion of the first camera 121a may protrude by a predetermined distance dl from the second part 143b of the door dike 143.

The photographing angle indicating an angle between the photographing direction of the first camera 121a and the second part 143b of the door dike 143 may be an angle obtained by subtracting a preset opening angle from 90 degrees.

This will be described later.

FIGS. 16A and 16B may also be applied to cross-sectional views taken based on a case in which one camera is provided in the door dike 143 and cross-sectional views taken on the basis of the second camera 121b.

Figure 17:
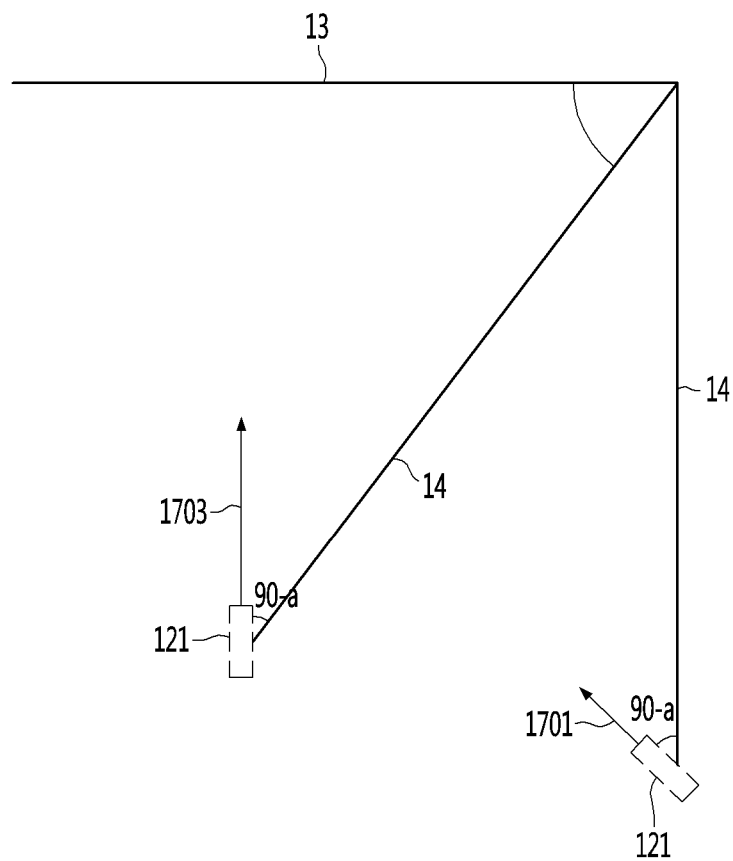
FIG. 17 is a diagram for describing a photographing direction of a camera when an outer door is opened to 90 degrees and the outer door is opened to a preset angle according to an embodiment of the present disclosure.

FIG. 17 is a diagram for describing a photographing direction of a camera when an outer door is opened to 90 degrees and the outer door is opened to a preset angle according to an embodiment of the present disclosure.

Referring to FIG. 17, when the outer door 14 is opened to 90 degrees with respect to the inner door 13 in a closed state, an photographing angle that is an angle between the photographing direction 1701 of the camera 121 and the outer door 14 may be an angle by subtracting a preset opening angle a from 90 degrees.

That is, the camera 121 may be disposed to be tilted by (90-a) degrees with respect to the outer door 14, precisely, the second part 143b of the door dike 143.

The reason for this is to accurately photograph the front surface of the inner door 13 when the opening angle of the outer door 14 reaches the preset opening angle "a".

That is, when the outer door 14 is opened to the preset opening angle "a", the photographing direction 1703 of the camera 121 may face the front surface of the inner door 13. Accordingly, foods in the inner door 13 may be accurately photographed without blurring.

When the preset opening angle is 60 degrees, the tilting angle of the camera 121 may be 30 degrees.

Although the description is given on the assumption that one camera is provided in the door dike 143 with reference to FIG. 17, the embodiment of FIG. 17 may be applied to each camera even when two cameras are provided in the door dike 143.

Again, description is given with reference to FIG. 11.

The processor 180 of the refrigerator 10 may obtain a food storage state of the inner door 13 based on an image photographed by one or more cameras (S1111).

The processor 180 may recognize a plurality of food items included in the photographed image by using an image recognition model.

The processor 180 may obtain the food storage state based on information about the recognized plurality of food items. The food storage state may include information about the types, positions, and number of the plurality of food items provided in the inner door 13.

The image recognition model may be an artificial neural network-based model trained through a deep learning algorithm or a machine learning algorithm.

The image recognition model may include an object detection model and an object identification model.

The object detection model may be a model for detecting one or more objects from image data, and the object identification model may be a model for identifying what are one or more objects detected.

The object detection model may be an artificial neural network-based model trained by a deep learning algorithm or a machine learning algorithm.

The object detection model may be a model that is trained by the learning processor 130 of the artificial intelligence device 100 and stored in the memory 170.

As another example, the object detection model may be a model trained by the learning processor 240 of the AI server 200 and transmitted from the AI server 200 to the artificial intelligence device 100.

An example of detecting a plurality of objects from an image using the object detection model will be described with reference to the accompanying drawings.

The object may be a food.

Figure 18:
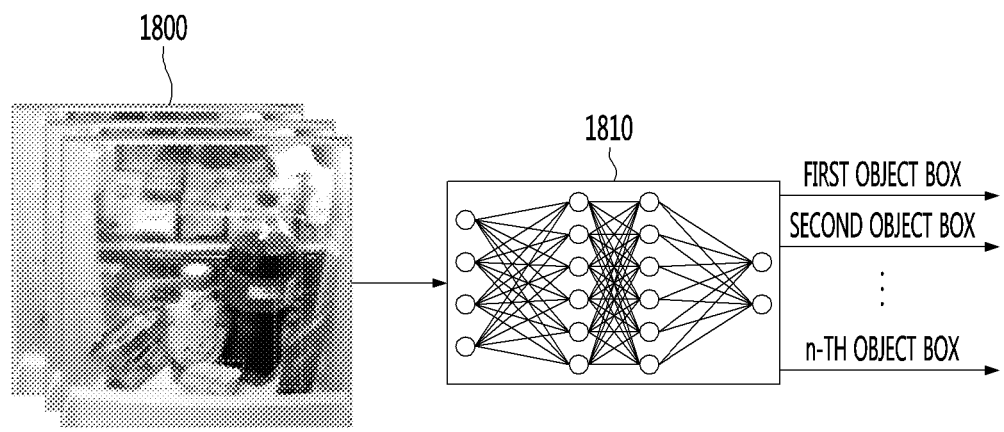
FIGS. 18 and 19 are diagrams for describing a learning process of an object detection model according to an embodiment of the present disclosure.
Figure 19:
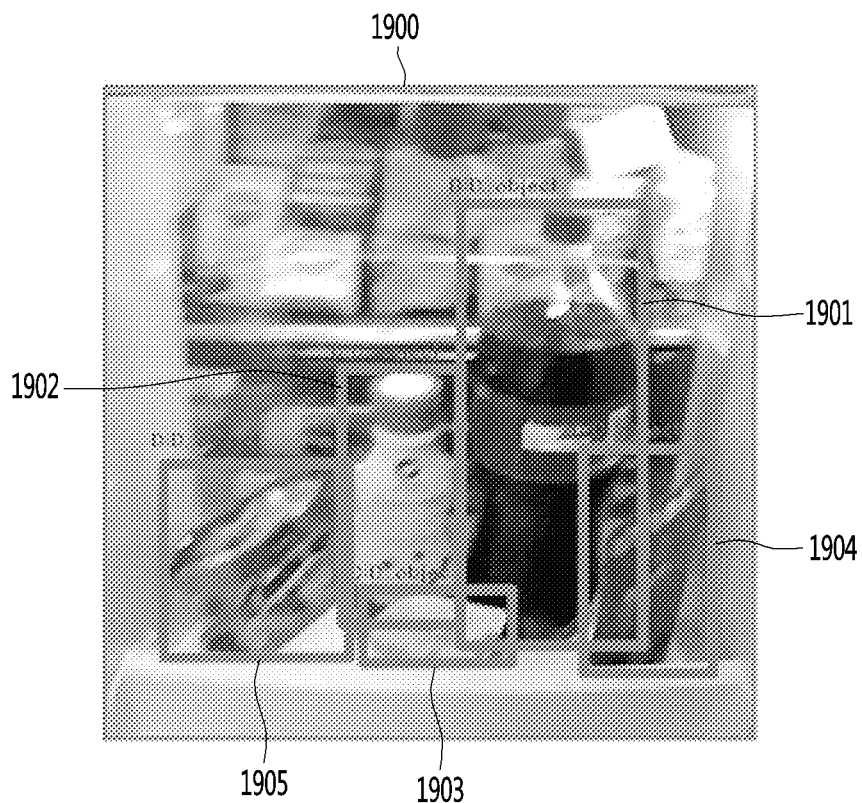

FIGS. 18 and 19 are diagrams for describing a learning process of an object detection model according to an embodiment of the present disclosure.

Referring to FIG. 18, an object detection model 1810 may obtain an object bounding box set containing a plurality of objects from pieces of training image data using a training image data set 1800 including a plurality of pieces of image data.

The object bounding box set may be a set of bounding boxes containing an object.

The object detection model 1800 may detect a plurality of objects from the image data by using a YOLO (You Only Look Once) algorithm.

The YOLO algorithm may consist of a plurality of CNNs.

The YOLO algorithm will be described later.

The YOLO algorithm may include a grid division process, a prediction process, a reliability calculation process, and an object determination process.

The grid division process may be a process of dividing the image data 1900 into a plurality of grids. The size of each of the plurality of grids may be the same.

The prediction process may be a process of predicting the number of bounding boxes specified in a predefined shape with respect to the center of a grid for each grid.

The bounding box specified in a predefined shape may be generated from data by the K-average algorithm, and may contain dictionary information about the size and shape of an object.

Each bounding box may be designed to detect objects of different sizes and shapes.

Each bounding box may represent the shape or boundary of an object.

The reliability calculation process may be a process of calculating the reliability of the bounding box according to whether an object is included in each of the obtained bounding boxes or whether only a background is present alone.

The object determination process may be a process of determining that an object exists in a bounding box having reliability equal to or greater than a preset value according to the reliability calculation process.

Through the object determination process, the plurality of bounding boxes 1901 to 1905 included in the image data 1900 may be extracted.

A description will be given with reference to FIG. 5 again.

The processor 180 may obtain identification information of each object from the plurality of bounding boxes extracted through the object detection model 1800.

The processor 180 may identify an object existing in the bounding box from the image data corresponding to each bounding box using the object identification model.

The object identification model may be an artificial neural network-based model trained using a deep learning algorithm or a machine learning algorithm.

The object identification model may be a model trained through supervised learning.

The object identification model may be a model for inferring identification information of an object from image data. The identification information of the object may be information for identifying an object, such as a name of the object, an identifier of the object, and the like.

The object identification model may be a model for outputting identification information of an object using a training data set including training image data and labeling data labeled on the training image data as input data.

Figure 20:
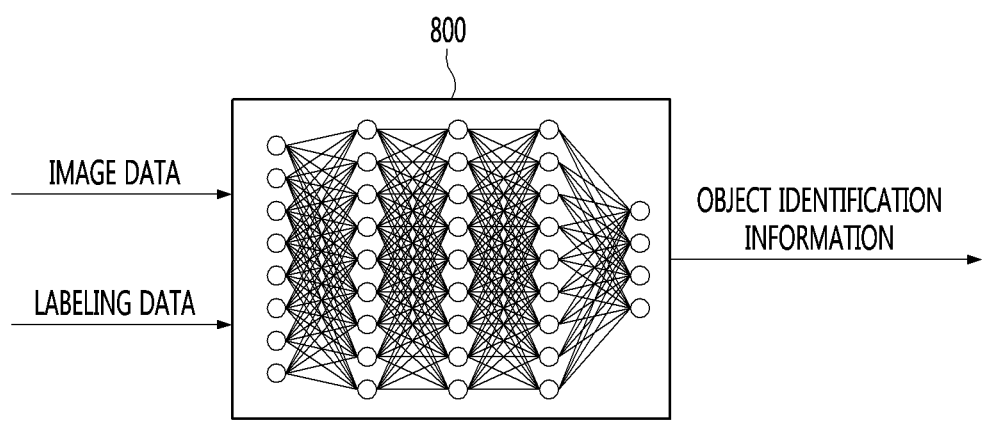
FIG. 20 illustrates a learning process of an object identification model according to an embodiment of the present disclosure.

FIG. 20 illustrates a learning process of an object identification model according to an embodiment of the present disclosure.

Referring to FIG. 20, an object identification model 2000 may infer object identification information using a training data set including training image data and labeling data labeled thereon.

The labeling data is correct answer data and may be object identification information.

The object identification model 2000 may be trained to minimize a cost function corresponding to the difference between the labeling data and the object identification information.

The cost function of the object identification model 2000 may be expressed as the squared mean of the difference between a label for object identification information corresponding to each image data and object identification information inferred from each image data.

When an input feature vector is extracted from the training image data and inputted, an object identification result is output as a target feature vector, and the object identification model 2000 may be trained to minimize a loss function corresponding to the difference between the target feature vector which is output and the labeled object identification information.

The object identification model 2000 may be trained by the learning processor 130 of the refrigerator 10 or the learning processor 240 of the AI server 200 and installed on the refrigerator 10.

The object identification model 2000 may determine first object identification information from first image data corresponding to a first bounding box 1901 shown in FIG. 19. For example, the first object identification information may be a beverage (or cola).

The object identification model 2000 may determine second object identification information from second image data corresponding to a second bounding box 1902. For example, the second object identification information may be milk.

As described above, it is possible to identify which food the object is, from the image data through the object identification model 2000.

Again, description is given with reference to FIG. 11.

The processor 180 may obtain a food storage state by using the obtained object identification information. The food storage state may include one or more of the kinds, the positions, and the number of the plurality of food items stored in the inner door 13.

The position of the food item may be obtained through the position of the object bounding box detected through the object detection model 1800.

The processor 180 of the refrigerator 10 may output food management information based on the obtained food storage state of the inner door 13 (S1113).

The food management information may include one or more of stock change information of food, purchase linkage information according to the stock of food, and recipe information.

The stock change information may be information indicating that the stock of food stored in the inner door 13 is changed.

The purchase linkage information may represent site information for purchasing a particular food according to the stock state of the food.

The recipe information may be information representing a recipe of a dish that may be cooked using a food stored in the inner door 13.

The processor 180 may output food management information through the transparent display 14-1 provided in the outer door 14.

The processor 180 may display the food management information on the transparent display 14-1 when the outer door 14 is completely closed.

Hereinafter, the food management information which is output when a user stores or removes a food in the inner door 13 will be described.

FIGS. 21A to 21D illustrate examples of food management information displayed on a transparent display when food is stored in an inner door of a refrigerator according to an embodiment of the present disclosure.

Figure 21A:
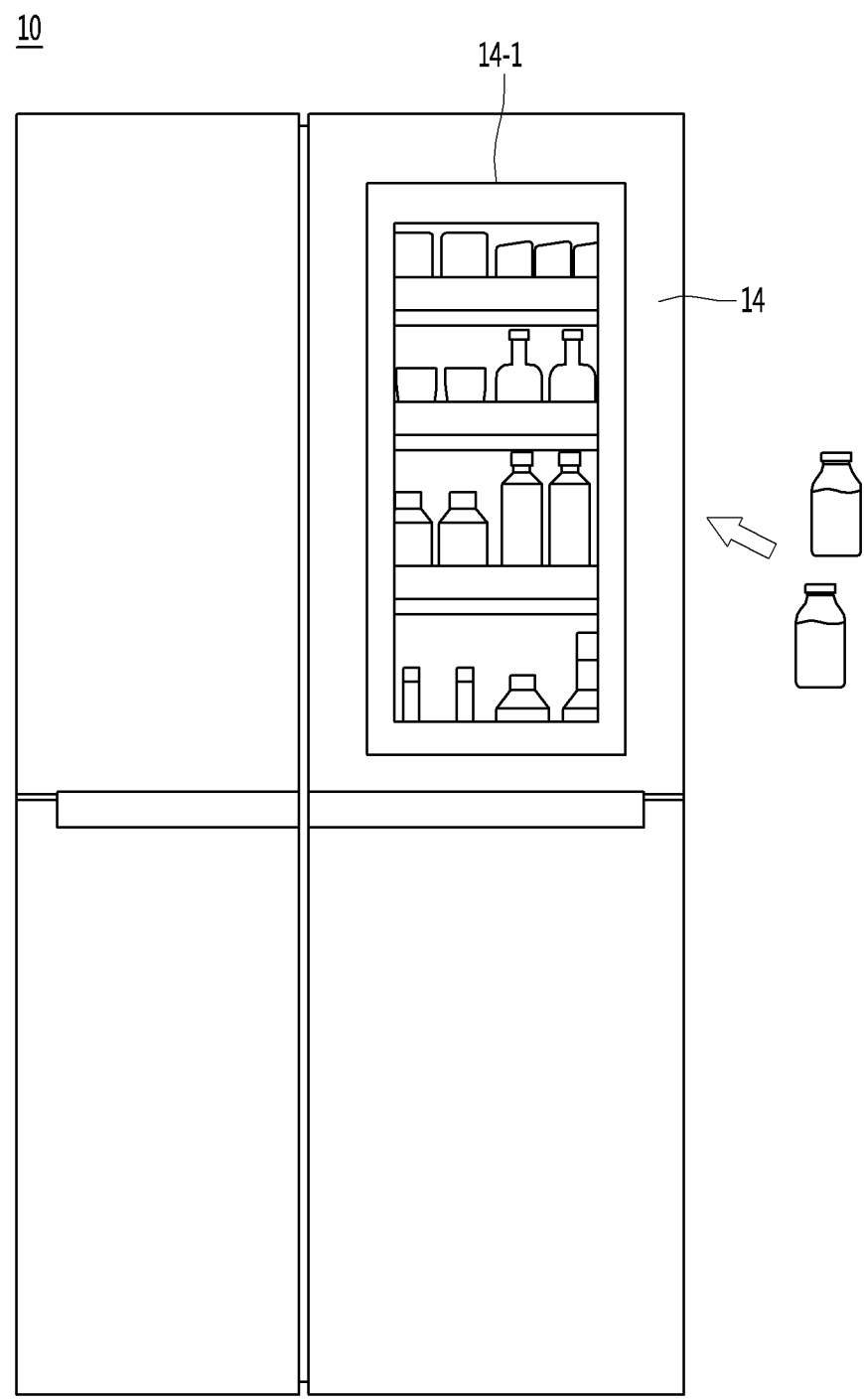
FIGS. 21A to 21D illustrate examples of food management information displayed on a transparent display when food is stored in an inner door of a refrigerator according to an embodiment of the present disclosure.

Referring to FIG. 21A, a user may store two milks in an inner door. The refrigerator 10 may detect the closing of the outer door 14 after the outer door 14 is opened and the two milks are stored in the inner door.

When the opening angle of the outer door 14 reaches a preset angle while the outer door 14 is being closed, the refrigerator 10 may photograph the inner door through one or more cameras.

The refrigerator 10 may identify each of the food items stored in the inner door based on the captured image, and obtain a food storage state based on the identified information.

The refrigerator 10 may display the food storage state on the transparent display 14-1.

Figure 21B:
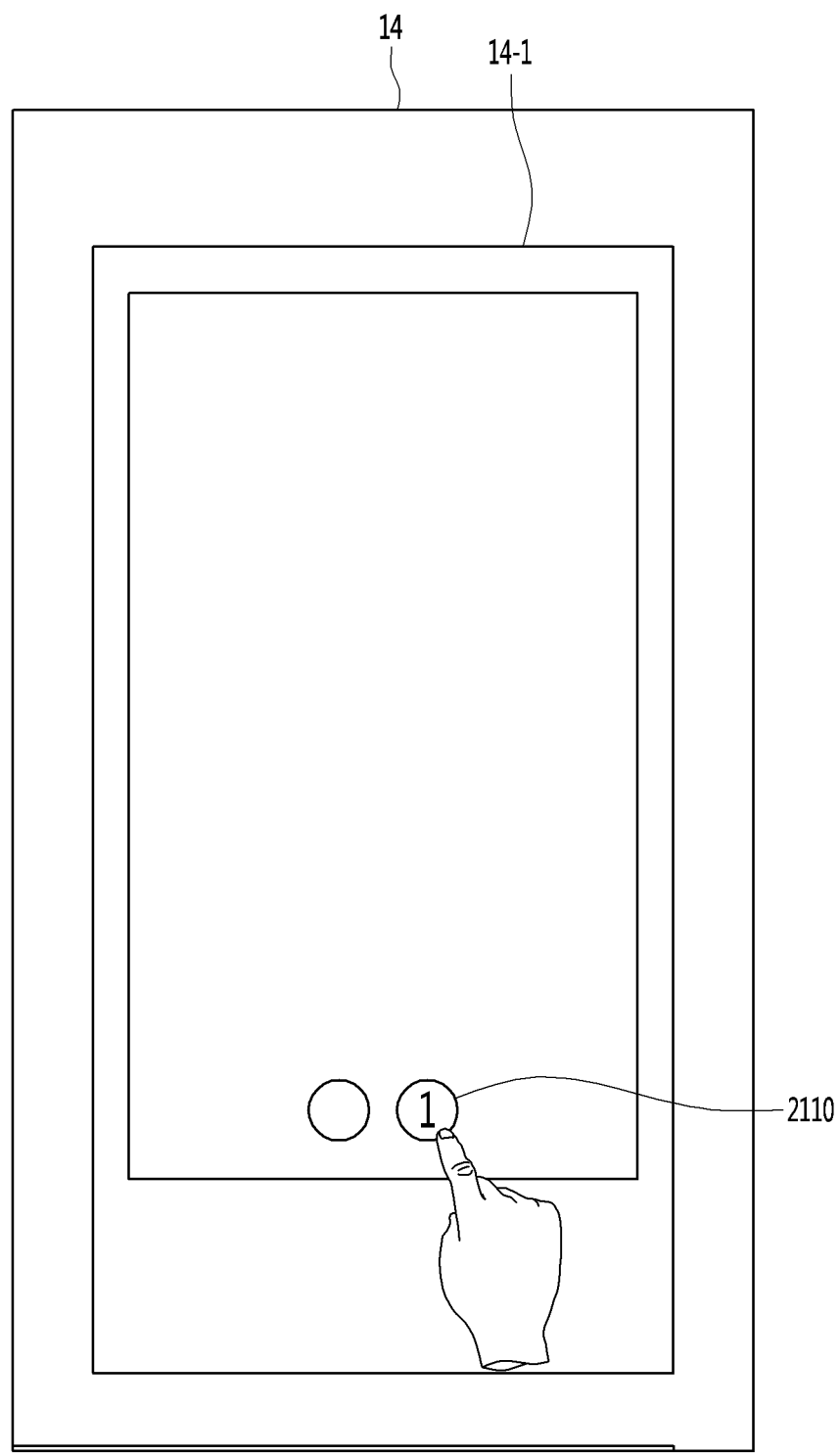

Referring to FIG. 21B, when the storage state of food items stored in the inner door is changed, the refrigerator 10 may display a notification 2110 indicating that the food storage state is changed on the transparent display 14-1.

The notification 2110 may be displayed in a visual form such as an icon or text, but is not limited thereto. That is, the refrigerator 10 may output a notification in the form of a speech.

Figure 21C:
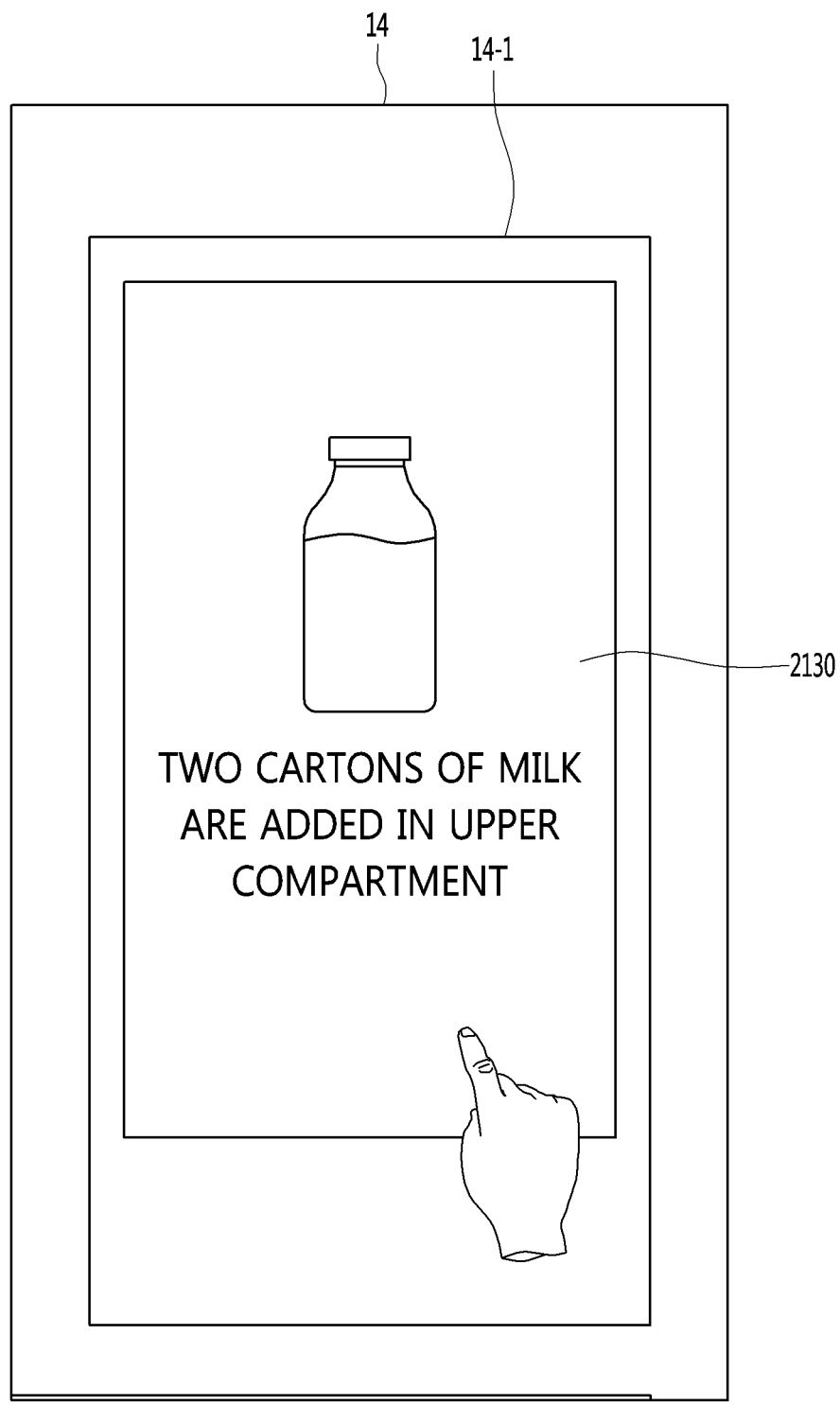

When the notification 2110 is selected, the refrigerator 10 may display the storage state information 2130 indicating the changed storage state of the food items on the transparent display 14-1 as illustrated in FIG. 21C.

The storage state information 2130 may include one or more of a name (milk) of the food put into the inner door, the number of foods (two), and an image of the food (milk image).

Figure 21D:
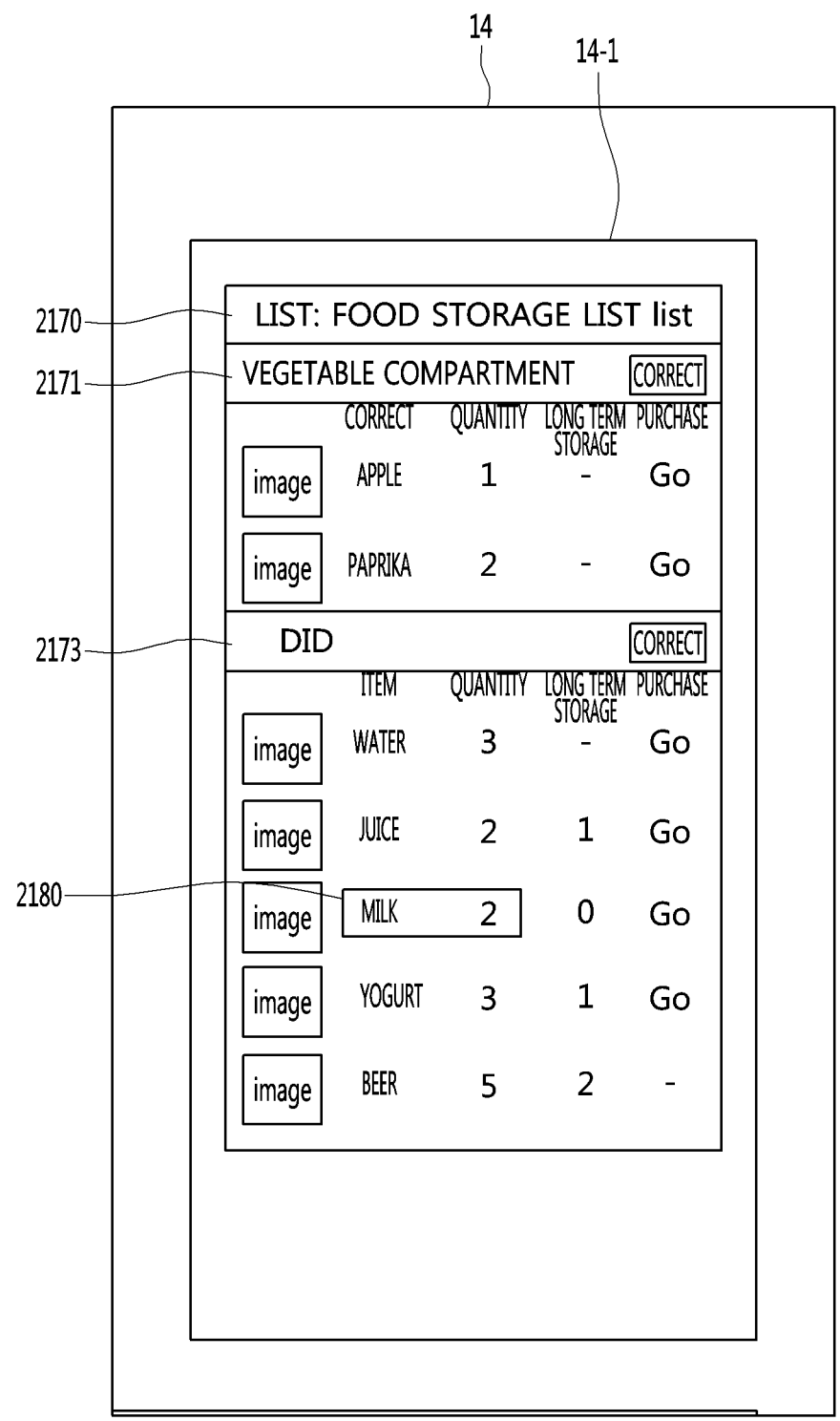

When the storage state information 2130 is selected through a user's touch, the refrigerator 10 may display the food management information 2170 on the transparent display 14-1 as illustrated in FIG. 21D.

The food management information 2170 may include information about foods stored in the refrigerator 10.

The food management information 2170 may include information 2171 about foods stored in a vegetable compartment and information 2173 about foods stored in the inner door.

The information 2171 about food items stored in the vegetable compartment may include an item, a quantity of each item, a long-term storage quantity, and a purchase item. The long-term storage quantity may be a quantity stored for a set period or more in consideration of the shelf life of each food item.

The information 2173 about the foods stored in the inner door may include items of foods stored in the inner door, the quantity of each item, the quantity stored for a long term, and the purchase item.

The purchase item may be an item that may be linked to a site for purchasing the food. When the purchase item corresponding to a specific item is selected, the refrigerator 10 may display a screen of a purchase site on which the item can be purchased on the transparent display 14-1. The user may easily purchase the food out of stock through the purchase site.

Meanwhile, since two milks are additionally stored in the inner door, the matters for addition of two milks may be reflected in the food management information 2170.

That is, the information 2173 on the foods stored in the inner door may reflect the matters 2180 to which two milks are added.

In this way, the user may receive services such as stock management, purchase linkage of a food through food management information corresponding to the inner door, feeling an improved user experience.

Next, an example of correcting food management information when an error occurs in a recognized food based on an image photographed through a camera will be described.

FIGS. 22A to 22C are diagrams for describing a process of correcting food management information when an error occurs in food recognition through image recognition according to an embodiment of the present disclosure.

Referring to FIG. 22A, food management information 2170 displayed on a transparent display is shown. As shown in FIG. 21A, a user stores two milks in an inner door, and a result of storing one milk may be obtained in a milk item 2210. This may be a case in which an error occurs when the food is recognized by the camera.

The user may take action to correct this error.

The food management information 2170 may include a correction item 2175 for correcting a food storage state.

When the correction item 2175 is selected in the refrigerator 10, as illustrated in FIG. 22B, a button 2230 for correcting the quantity of milk may be displayed on one side of the milk item 2210.

The refrigerator 10 may reflect the quantity of milk corrected according to the user input which is inputted to the button 2230 in the food management information 2170.

FIGS. 23A to 23D illustrate examples of food management information displayed on a transparent display when a food is withdrawn from an inner door of a refrigerator according to an embodiment of the present disclosure.

Figure 23A:
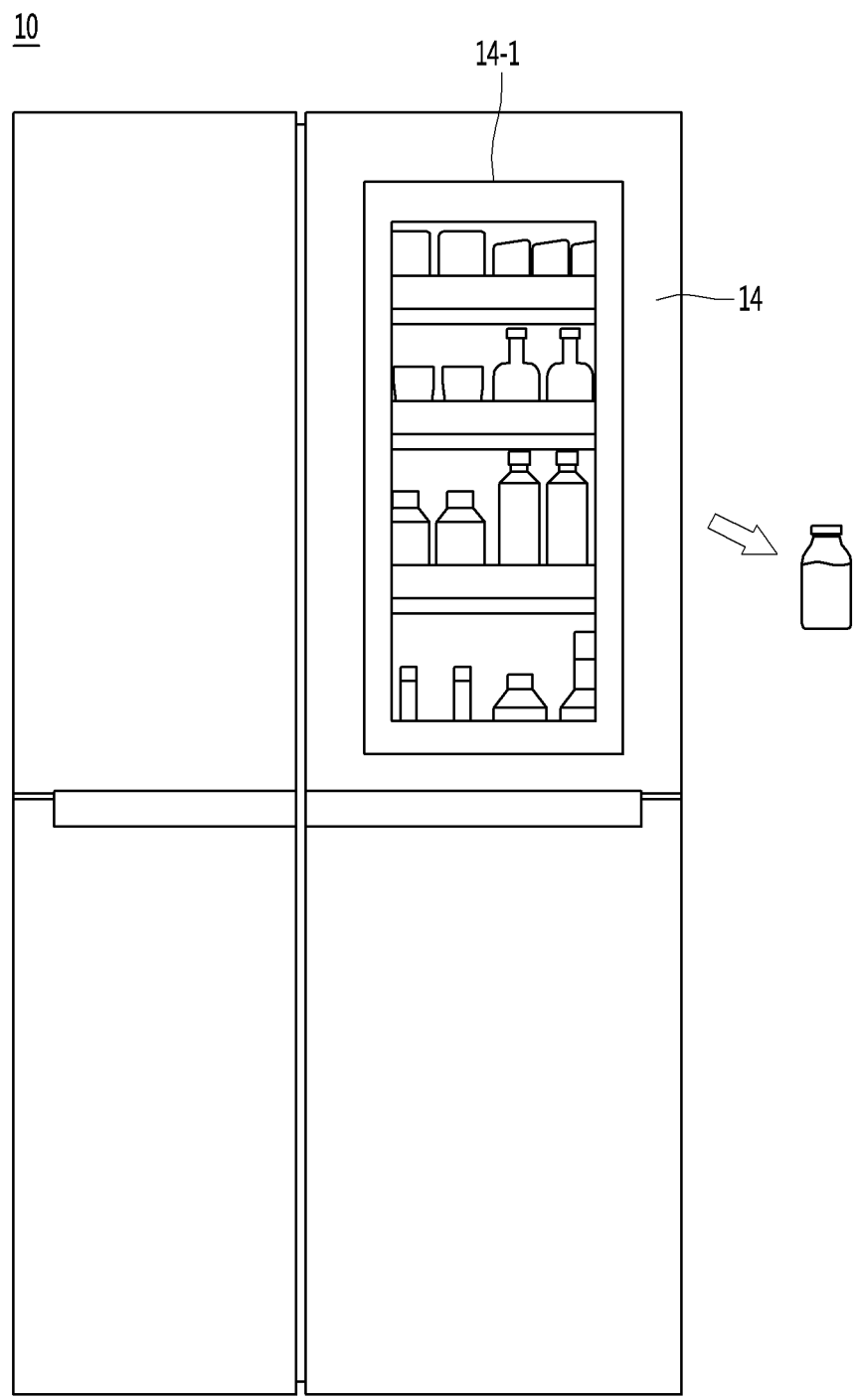
FIGS. 23A to 23D illustrate examples of food management information displayed on a transparent display when a food is withdrawn from an inner door of a refrigerator according to an embodiment of the present disclosure.

Referring to FIG. 23A, a user may withdraw one milk from an inner door. The refrigerator 10 may detect the closing of the outer door 14 after the outer door 14 is opened and one milk is drawn out.

When the opening angle of the outer door 14 reaches a preset angle while the outer door 14 is being closed, the refrigerator 10 may photograph the inner door through one or more cameras.

The refrigerator 10 may identify each of the food items stored in the inner door based on the captured image, and obtain a food storage state based on the identified information.

The refrigerator 10 may display the food storage state on the transparent display 14-1.

Figure 23B:
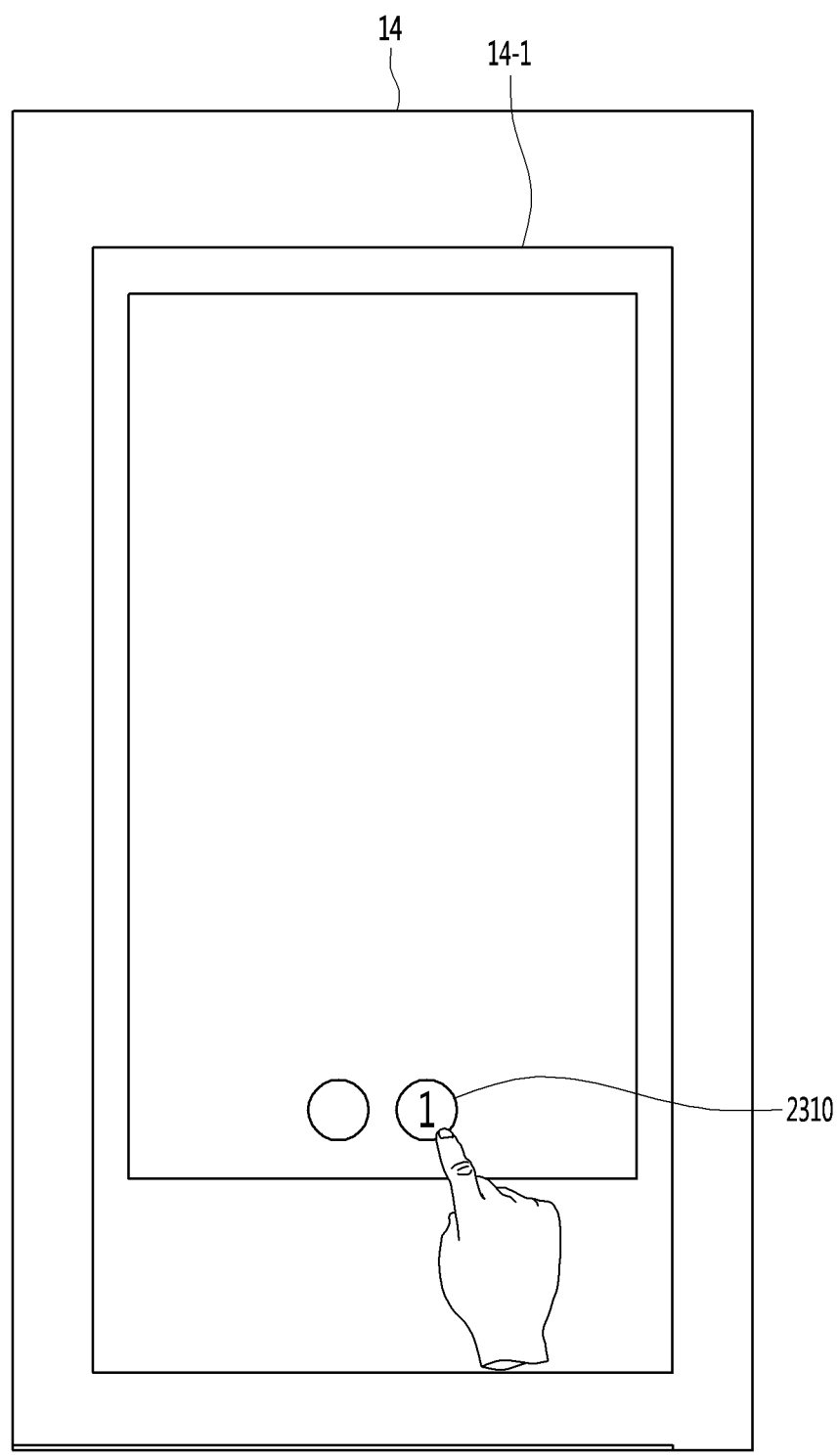

Referring to FIG. 23B, when the storage state of food items stored in the inner door is changed, the refrigerator 10 may display a notification 2110 indicating that the food storage state is changed on the transparent display 14-1.

The notification 2110 may be displayed in a visual form such as an icon or text, but is not limited thereto. That is, the refrigerator 10 may output a notification in the form of a speech.

Figure 23C:
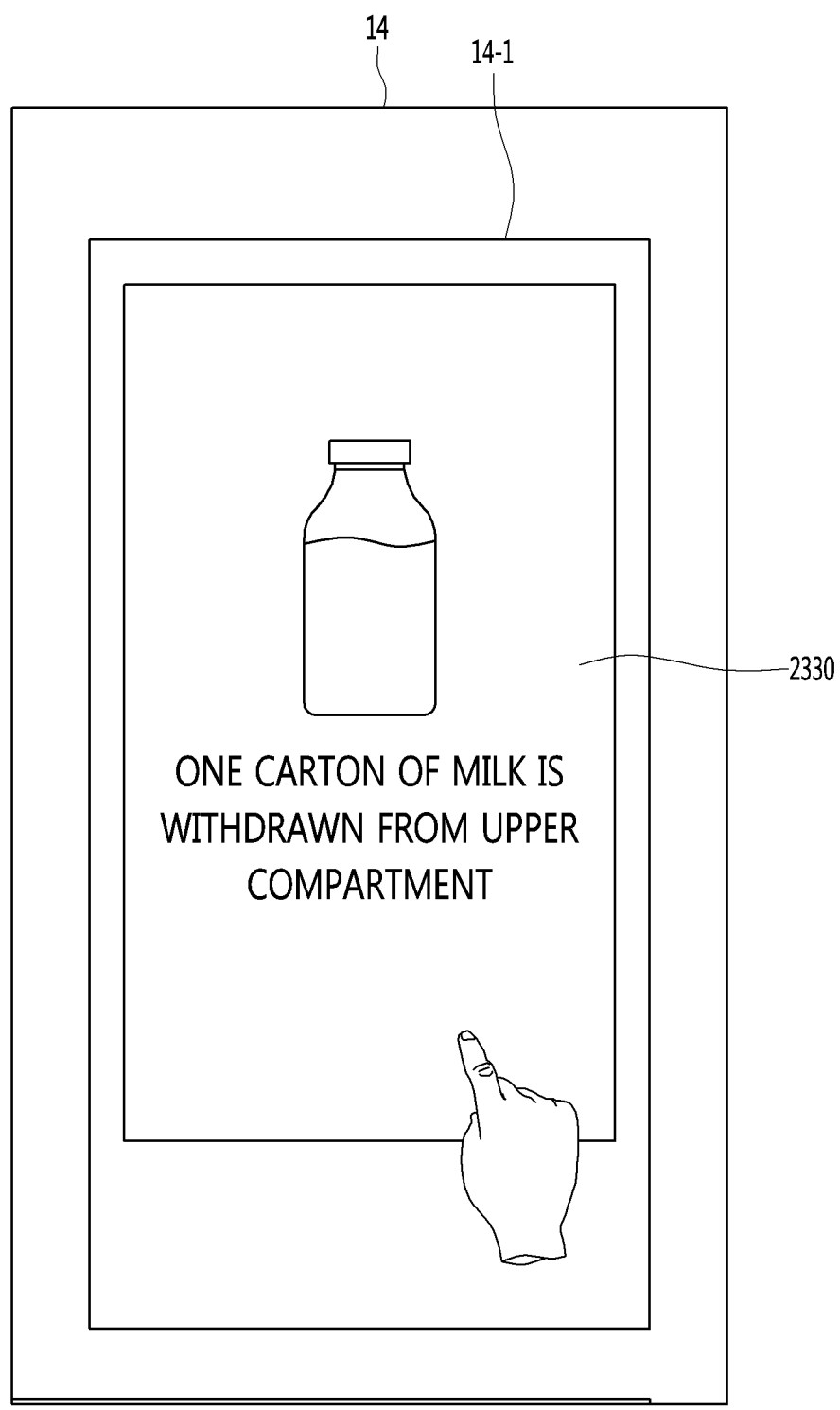

When the notification 2310 is selected, the refrigerator 10 may display the storage state information 2330 indicating the changed food storage state on the transparent display 14-1, as illustrated in FIG. 23C.

The storage state information 2130 may include one or more of the name (milk) of a food withdrawn from the inner door, the number of the foods withdrawn (one), and an image of the food (milk image) withdrawn.

Figure 23D:
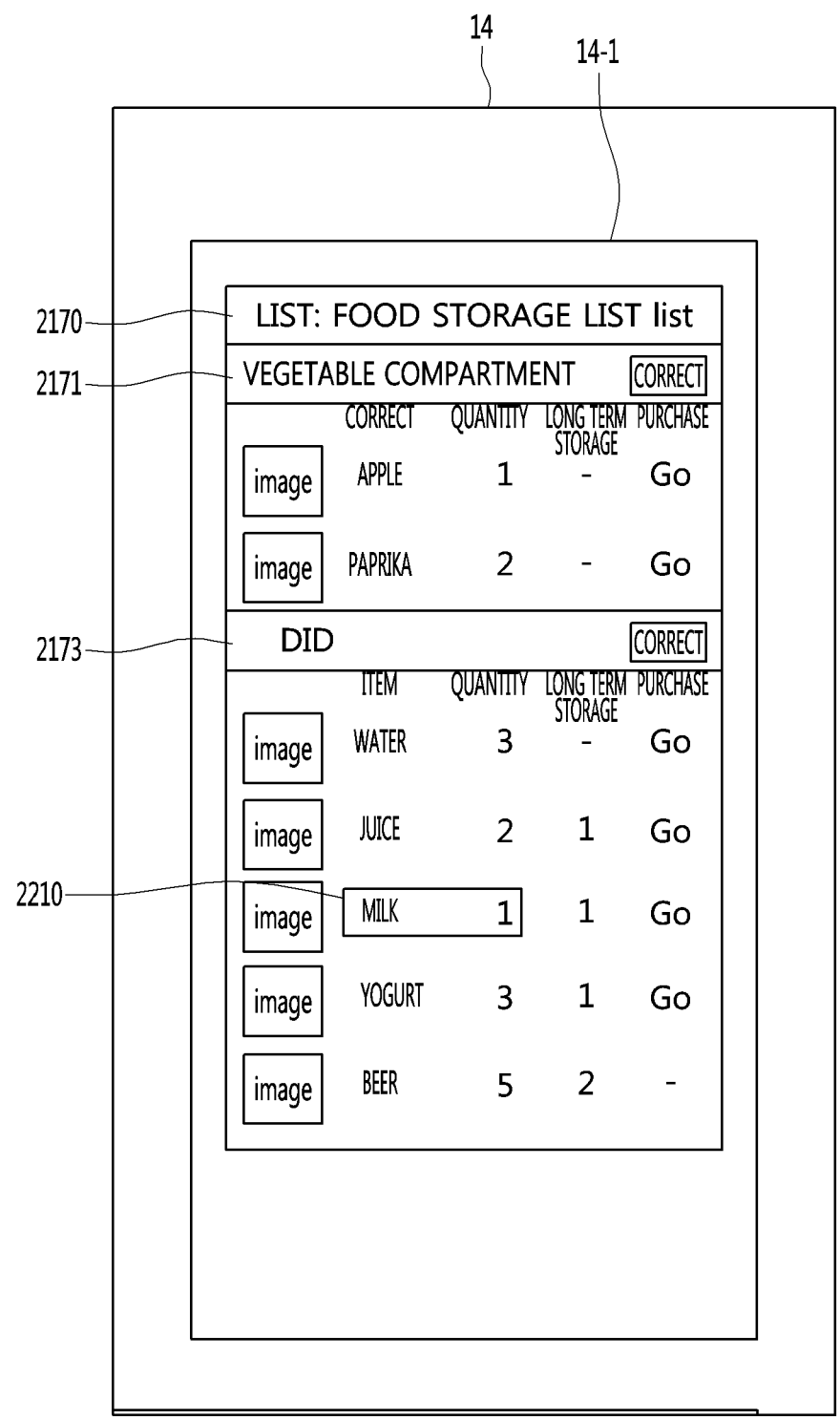

When the storage state information 2330 is selected through a user's touch, the refrigerator 10 may display the food management information 2170 on the transparent display 14-1, as illustrated in FIG. 23D.

The food management information 2170 may include information 2171 about foods stored in a vegetable compartment and information 2173 about foods stored in the inner door.

The detailed description of the food management information 2170 is replaced with the description with reference to FIG. 21D.

Meanwhile, since one milk is withdrawn from the inner door, the milk item 2210 may reflect a state in which one milk is withdrawn.

Again, description is given with reference to FIG. 11.

Meanwhile, in step S1103, when the opening angle of the outer door 14 is less than a preset angle, the processor 180 of the refrigerator 10 may photograph the inside of the refrigerator 10 through one or more cameras when the closing of the outer door 14 is detected (S1115).

Thereafter, the process proceeds to step S1111, and the processor 180 may obtain a food storage state of the inner door based on the photographed image (S1111), and output food management information based on the obtained food storage state (S1113).

Figure 24A:
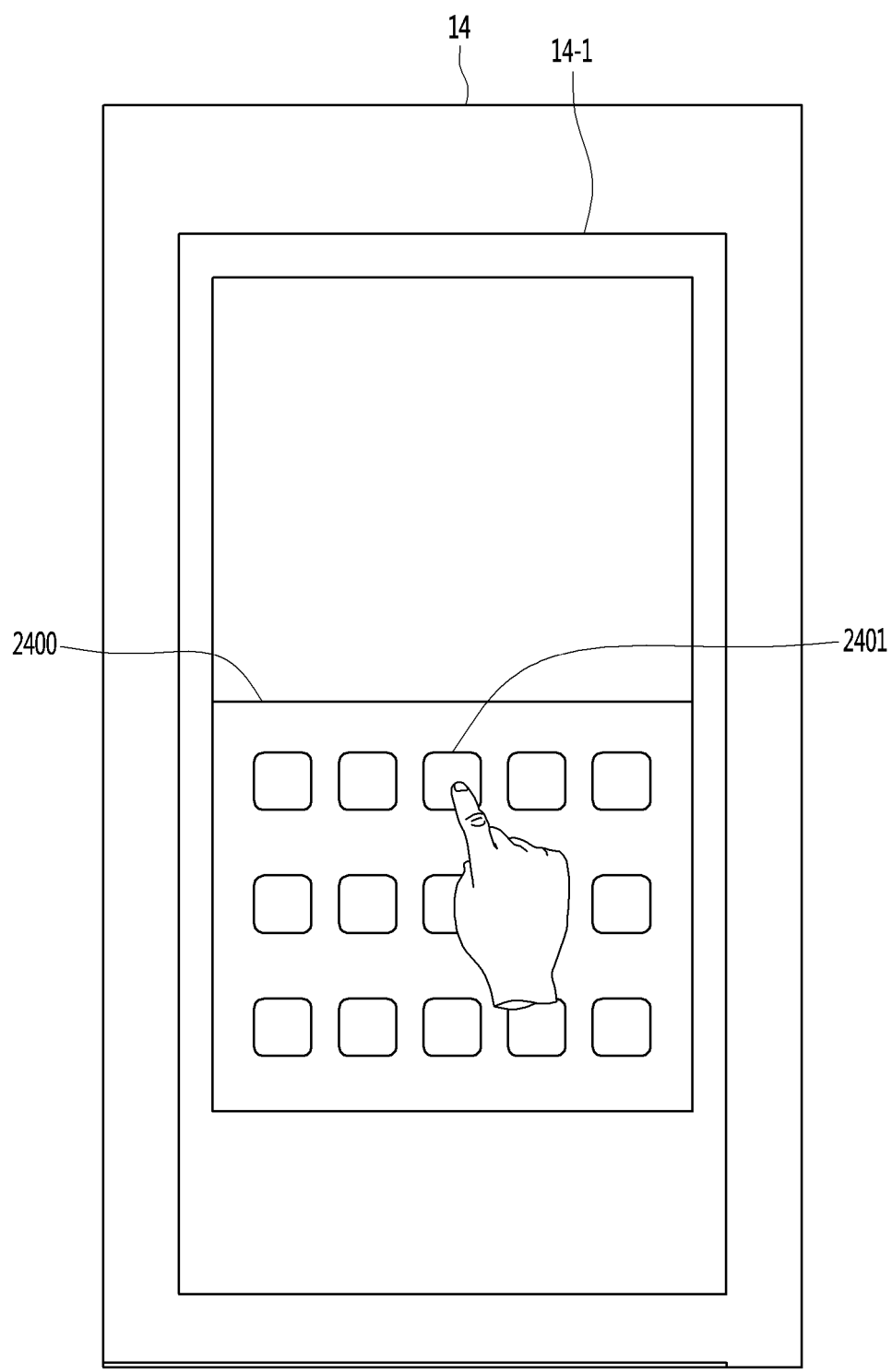

FIGS. 24A to 24C are diagrams for describing a process of recommending a recipe for cooking using a recognized food, according to an embodiment of the present disclosure.

Referring to FIG. 24A, the transparent display 14-1 may display an app list 2400 including a plurality of applications related to the refrigerator 10.

When a panoramic camera application 2401 included in the app list 2400 is selected, the refrigerator 10 may display a food list 2410 including foods recognized through a panoramic camera on the transparent display 14-1 as shown in FIG. 24B.

The panoramic camera is a camera attached to the ceiling of the refrigerator 10, and may be a camera for photographing a storage compartment located at a position further inward than the inner door.

As illustrated in FIG. 24C, when the plurality of foods are selected on the food list 2410, the refrigerator 10 may search for a plurality of recipes according to the types and number of selected foods.

The refrigerator 10 may provide a plurality of founded recipes through a recipe application.

FIGS. 25A to 25D illustrate a process of purchasing food through a transparent display provided in a refrigerator.

Referring to FIG. 25A, a food list 2410 is shown. When a purchase button 2501 corresponding to an eggplant is selected on the food list 2410, the refrigerator 10 may display a first pop-up window 2510 on the transparent display 14-1 asking for the intention to purchase the eggplant.

Figure 25B:
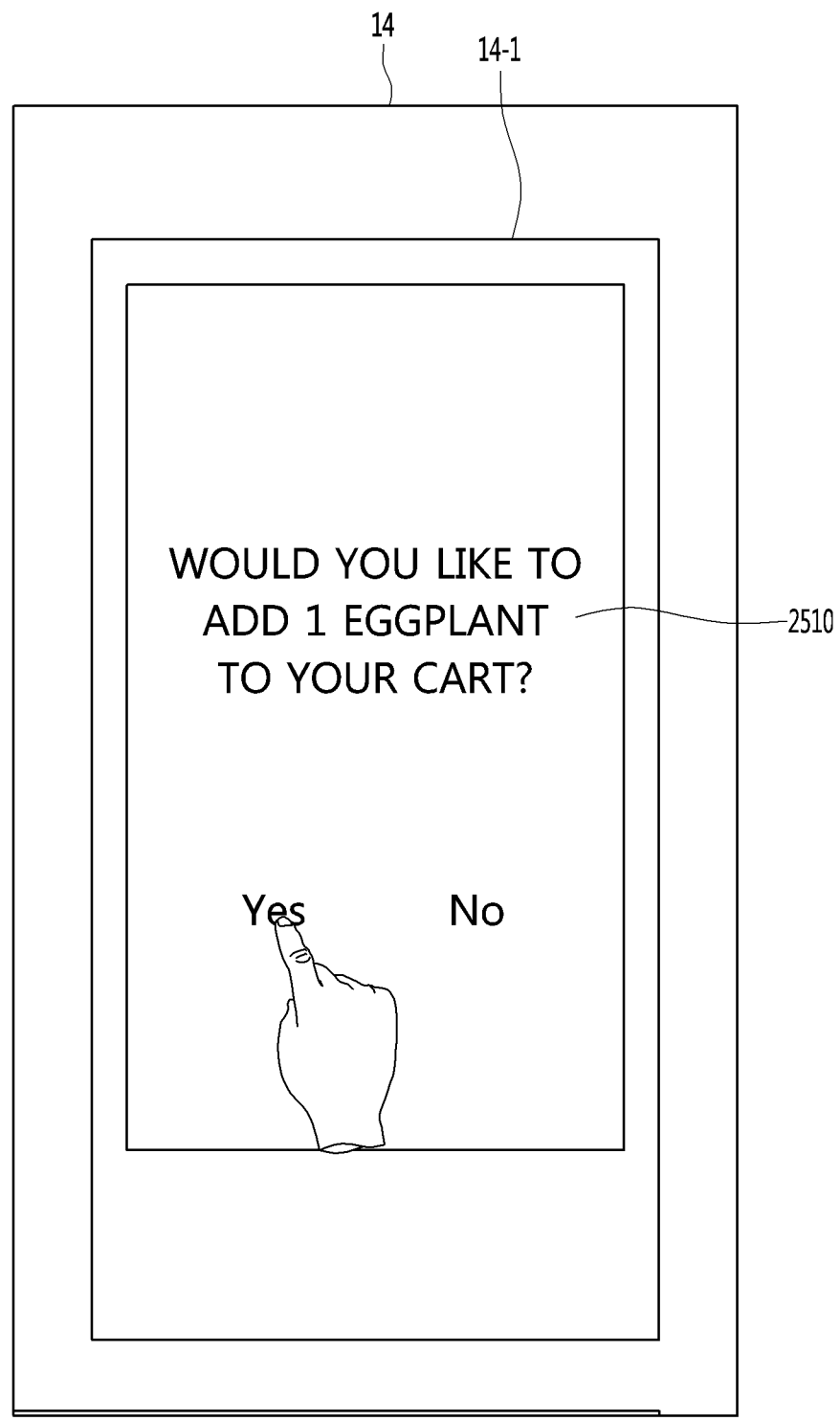
Figure 25C:
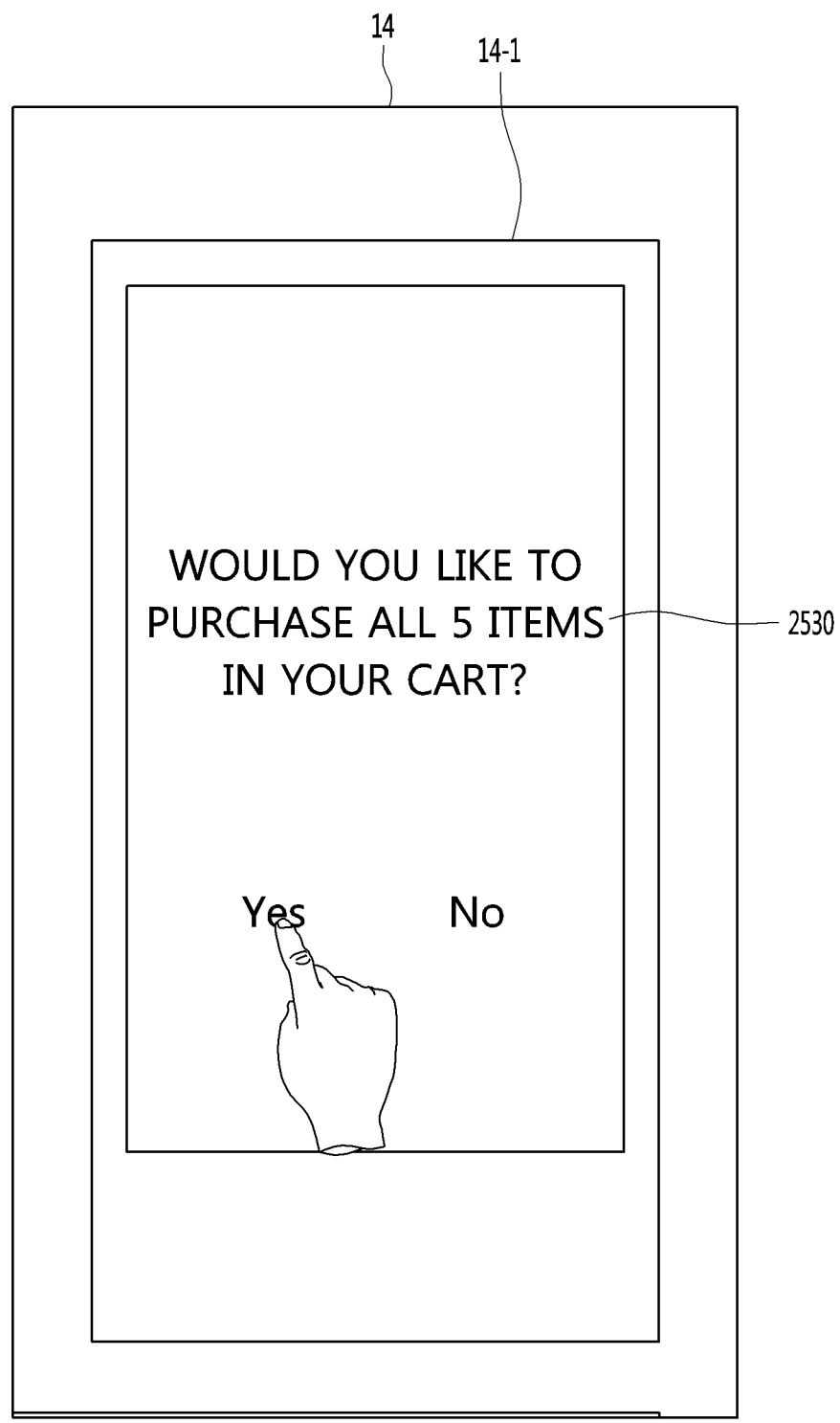

When the refrigerator 10 receives an input to agree to a intention to purchase other foods besides eggplant, as shown in FIG. 25C, a second pop-up window 2530 that asks to confirm the purchase of a plurality of foods for which a purchase intention is indicated may be displayed on the transparent display 14-1.

Figure 25D:
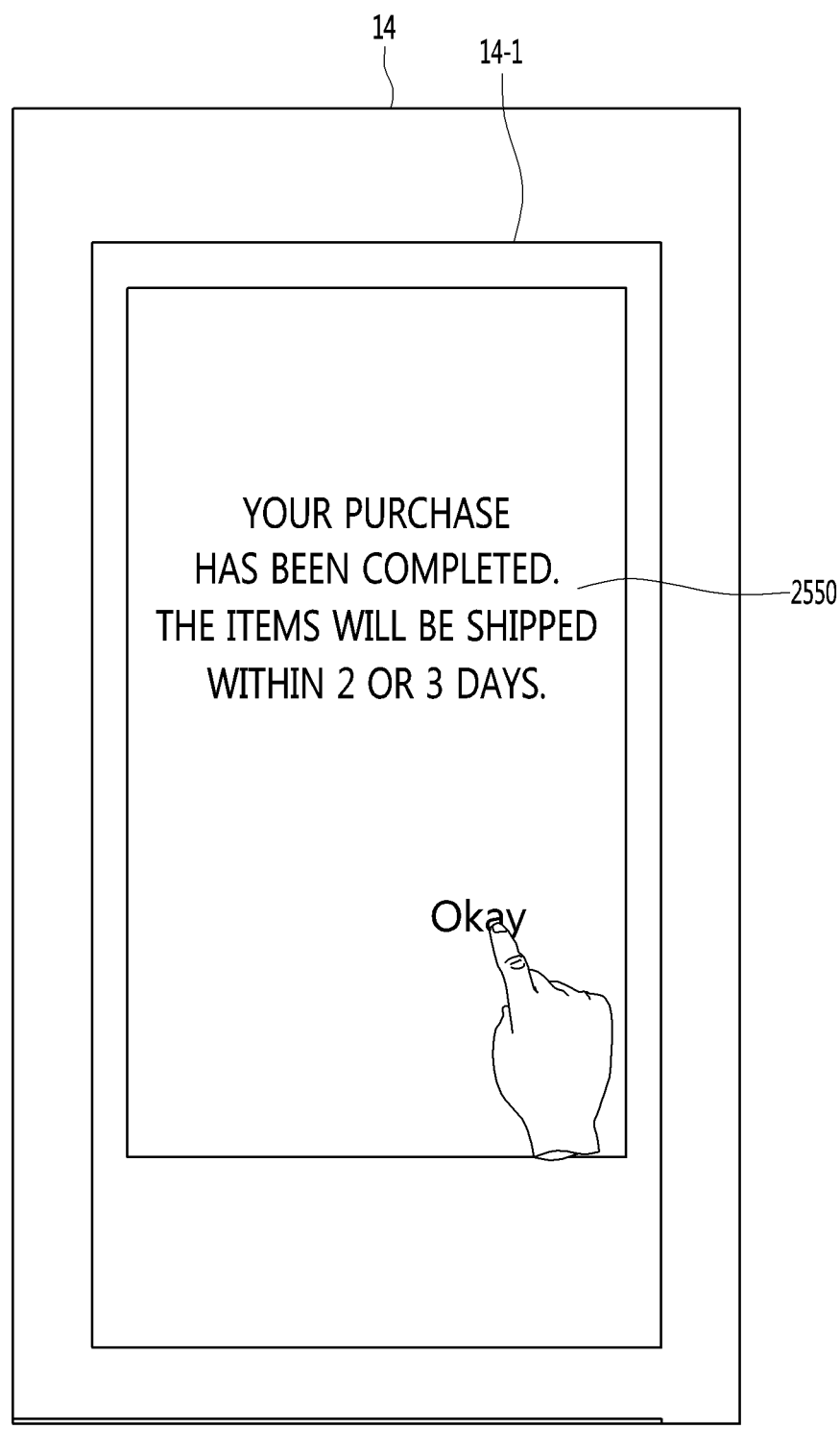

When the refrigerator 10 receives an input for confirming the purchase through the second pop-up window 2530, as illustrated in FIG. 25D, the refrigerator 10 may display a third pop-up window 2550 indicating the completion of the purchase on on the transparent display 14-1.

As described above, according to the embodiment of the present disclosure, the user may simply and conveniently purchase the food which the user wants to purchase on the transparent display 14-1.

On the other hand, when the inner door 13 is photographed through one or more cameras provided in the outer door 14, foods in the inner storage compartment located at a position further inward than the inner door 13 may also be photographed.

Therefore, in order to recognize only the food items stored in the inner door 13, a process of removing the food items stored in the inner storage chamber is required.

Figure 26:
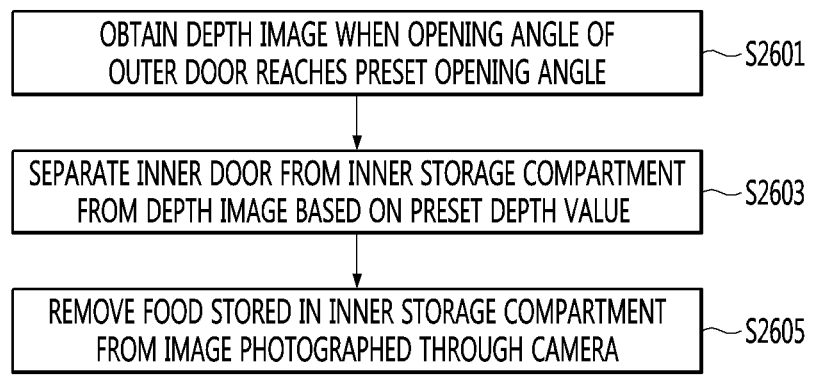
FIGS. 26 and 27 are diagram for describing a process of distinguishing food stored in an inner door from food stored in an inner storage compartment disposed inside the inner door, according to an embodiment of the present disclosure.
Figure 27:
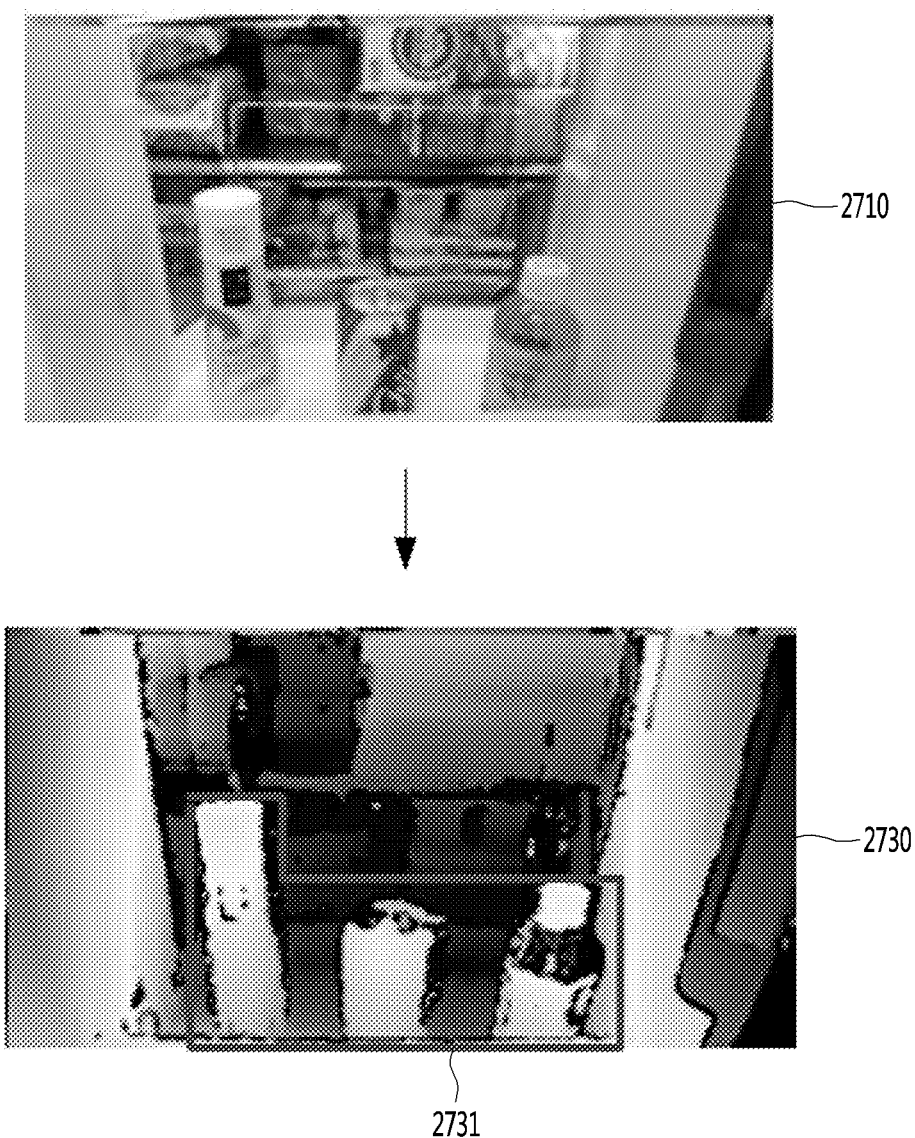

FIGS. 26 and 27 are diagram for describing a process of distinguishing food stored in an inner door from food stored in an inner storage compartment disposed inside the inner door, according to an embodiment of the present disclosure.

First, referring to FIG. 26, the processor 180 of the refrigerator 10 may obtain a depth image through a depth sensor when a preset opening angle is reached while the outer door 14 is being closed (S2601).

Step S2601 may be performed simultaneously with step S1109 of FIG. 11.

The arrangement location of the depth sensor may be disposed at a position adjacent to the camera 121 provided in the door dike 143 of the outer door 14.

The reason for this is that a view of the image photographed by the camera 121 and a view the depth image obtained through the depth sensor need to be the same. That is, when the views are different from each other, an additional process of determining whether the food included in the image photographed by the camera 121 is identical to the food included in the depth image may be required, leading to loss in image processing.

Referring to FIG. 27, the inner door and a portion 2710 of the inner storage compartment are shown. The processor 180 may obtain a depth image 2730 corresponding to the portion 2710 using the depth sensor.

The processor 180 may separate the inner door 13 and the inner storage compartment from the obtained depth image based on a preset depth value (S2603).

In an embodiment, the preset depth value may be a horizontal distance of an area occupied by the inner door 13.

The processor 180 may perform separation for an area having a value larger than a preset predetermined threshold value as the inner storage compartment and an area having a value smaller than the preset threshold value as the inner door 13, respectively.

Referring to FIG. 27, the depth image 2730 may be divided into an area 2731 corresponding to the inner door 13 and other areas according to a preset depth value.

The processor 180 may remove an area corresponding to the inner storage compartment from an image photographed by the one or more cameras as a result of the separation step (S2605).

The processor 180 may recognize foods stored in the inner door 13 based on the image after the area corresponding to the inner storage compartment is removed. In this regard, the embodiment of FIGS. 18 to 20 may be applied.

As described above, according to the embodiment of the present disclosure, it is possible to correctly recognize foods stored in the inner door 13 by distinguishing the food stored in the inner door 13 from the food stored in an inner storage compartment provided inside the inner door 13.

Meanwhile, steps S2603 and S2605 may be performed by the processor 260 of the AI server 200. In this case, the refrigerator 10 may transmit an image photographed by the camera and a depth image acquired through a depth sensor to the AI server 200.

The present disclosure described above may be embodied as computer readable codes on a medium in which a program is recorded. The computer-readable medium includes all kinds of recording devices in which data readable by a computer system is stored. Examples of the computer readable medium may include a hard disk drive (HDD), a solid state disk (SSD), a silicon disk drive (SDD), a ROM, a RAM, a CD-ROM, a magnetic tape, a floppy disk, an optical data storage device, and the like. The computer may also include the processor 180 of an artificial intelligence device.

What is claimed is:
1. An artificial intelligence refrigerator, comprising:
a depth sensor;
an inner door;
an outer door having a transparent display;
one or more cameras provided in the outer door;
a second sensor configured to detect at least an opening of the outer door, a closing of the outer door or an angle that the outer door is opened; and
at least one processor configured to:
determine whether the angle is greater than or equal to a preset angle based at least in part on detecting a movement of the outer door,
cause a camera from among the one or more cameras to capture an image of the inner door based at least in part on the angle being determined to be less than the preset angle,
determine a storage state of food items located in the inner door based on the captured image,
cause a display, on the transparent display, of food management information associated with the food items based on the determined storage state,
partition the inner door and an inner storage compartment located inside the inner door based at least in part on a depth image obtained through the depth sensor, and
distinguish a region corresponding to the partitioned inner storage compartment from the captured image, wherein the storage state is obtained based at least in part on the captured image including the distinguished region.

2. The artificial intelligence refrigerator of claim 1, wherein the outer door comprises:
an outer case,
a door liner mounted on a rear side of the outer case, and
a door dike disposed in the door liner to attach an outer basket capable of food storage at the rear side, and
wherein the one or more cameras are disposed on the door dike.

3. The artificial intelligence refrigerator of claim 2, wherein
the door dike comprises:
a first part disposed approximate to a hinge which enables the outer door to be rotatable, and
a second part disposed to face the first part and disposed farther from the hinge with respect to the first part, and
wherein the one or more cameras are disposed in the second part.

4. The artificial intelligence refrigerator of claim 3, wherein the second part protrudes to a predetermined height from the door liner and includes a first surface, a second surface facing the first surface, and a third surface connecting the first and second surfaces, and
wherein the one or more cameras are disposed on the first surface.

5. The artificial intelligence refrigerator of claim 4, wherein the one or more cameras are disposed to be tilted by a particular angle corresponding to a difference between the preset angle and 90 degrees.

6. The artificial intelligence refrigerator of claim 5, wherein the preset angle is 60 degrees.

7. The artificial intelligence refrigerator of claim 1, wherein the image is captured based at least in part on causing the camera to capture the image in response to detecting the closing of the outer door and the angle being determined to be less than the preset angle.

8. The artificial intelligence refrigerator of claim 1, further comprising:
a memory,
wherein the at least one processor is further configured to:
obtain an object bounding box set containing representations of food from the captured image using an object detection model stored in the memory, and
identify the representations of food in the object bounding box using an object identification model stored in the memory, wherein the object detection model and the object identification model are trained using a deep learning algorithm.

9. The artificial intelligence refrigerator of claim 8, wherein the storage state of food items indicates an insertion or a withdrawal of the food items based on the identified representations of food.

10. The artificial intelligence refrigerator of claim 9, wherein the food management information includes, based on the determined storage state, at least one of stock change information for the food items, purchase linkage information for the food items, or recipe information using the food items.

11. The artificial intelligence refrigerator of claim 1, wherein the second sensor comprises at least one of an electromagnet sensor, an acceleration sensor or a switch sensor.

12. The artificial intelligence refrigerator of claim 1, wherein the at least one processor is further configured to cause a second camera from among the one or more cameras to capture a second image of an upper compartment of the inner door, and cause a third camera from among the one or more cameras to capture a third image of a lower compartment of the inner door.

13. The artificial intelligence refrigerator of claim 1, wherein the food management information is displayed on the transparent display after the outer door is closed.

14. An artificial intelligence (AI) refrigerator, comprising:
a depth sensor;
an inner door;
an outer door having a transparent display;
one or more cameras provided in the outer door;
a second sensor configured to detect at least an opening of the outer door, a closing of the outer door or an angle that the outer door is opened;
a communication interface configured to communicate with an AI server, and
at least one processor configured to:
determine whether the angle is greater than or equal to a preset angle based at least in part on detecting a movement of the outer door,
cause a camera from among the one or more cameras to capture an image of the inner door based at least in part on the angle being determined to be less than the preset angle,
transmit, to the AI server, the captured image through the communication interface,
receive, from the AI server, a storage state of food items located in the inner door based on the transmitted captured image and food management information associated with the food items,
cause a display, on the transparent display, of the received food management information based on the received storage state,
partition the inner door and an inner storage compartment located inside the inner door based at least in part on a depth image obtained through the depth sensor, and
distinguish a region corresponding to the partitioned inner storage compartment from the captured image, wherein the storage state is obtained based at least in part on the captured image including the distinguished region.

* * * * *